United States Patent
Monden et al.

(10) Patent No.: US 9,752,304 B2
(45) Date of Patent: Sep. 5, 2017

(54) WORK VEHICLE AND METHOD OF CONTROLLING WORK VEHICLE

(71) Applicant: KOMATSU LTD., Tokyo (JP)

(72) Inventors: Hiroshi Monden, Hiratsuka (JP); Tatsuro Nohara, Erie, PA (US); Shogo Miyazaki, Hiratsuka (JP); Shunsuke Miyamoto, Atsugi (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/888,774

(22) PCT Filed: Nov. 25, 2014

(86) PCT No.: PCT/JP2014/081110
§ 371 (c)(1),
(2) Date: Nov. 3, 2015

(87) PCT Pub. No.: WO2015/093241
PCT Pub. Date: Jun. 25, 2015

(65) Prior Publication Data
US 2016/0083930 A1    Mar. 24, 2016

(30) Foreign Application Priority Data

Dec. 16, 2013 (JP) .................................. 2013-259381

(51) Int. Cl.
*E02F 9/20* (2006.01)
*E02F 3/28* (2006.01)
(Continued)

(52) U.S. Cl.
CPC ............ *E02F 9/2079* (2013.01); *B60K 6/365* (2013.01); *B60K 6/445* (2013.01); *B60K 17/08* (2013.01);
(Continued)

(58) Field of Classification Search
CPC ......... B60K 17/08; B60K 6/365; E02F 3/283; E02F 9/2079; B60W 10/10; B60W 20/00;
(Continued)

(56) References Cited

U.S. PATENT DOCUMENTS 5,139,465 A   8/1992 Sato
7,070,531 B2  7/2006 Ishizaki
(Continued)

FOREIGN PATENT DOCUMENTS

DE   10 2005 041 391 A1   2/2006
JP       2-261952 A       10/1990
(Continued)

OTHER PUBLICATIONS

The International Search Report for the corresponding international application No. PCT/JP2014/081110, issued on Feb. 17, 2015.
(Continued)

*Primary Examiner* — Atul Trivedi
(74) *Attorney, Agent, or Firm* — Global IP Counselors, LLP

(57) ABSTRACT

A power transmission includes first and second clutches for switching a transmission path for a driving force therein. A clutch controlling unit provided for a work vehicle is configured to switch the transmission path from one to the other of first and second modes when a speed ratio parameter reaches a mode switching threshold. The clutch controlling unit is configured to keep setting the transmission path in the other mode even when the speed ratio parameter again reaches the mode switching threshold until a switching prohibition period having a predetermined initial value expires as long as a period of time elapsed after mode switching is included in the switching prohibition period. A trigger detecting unit provided for the work vehicle is configured to make the switching prohibition period expire
(Continued)

when detecting a predetermined operation in the switching prohibition period.

14 Claims, 14 Drawing Sheets

(51) Int. Cl.
| | |
|---|---|
| *F16H 61/16* | (2006.01) |
| *B60K 17/08* | (2006.01) |
| *B60K 6/365* | (2007.10) |
| *B60K 6/445* | (2007.10) |
| *B60W 10/10* | (2012.01) |
| *B60W 20/00* | (2016.01) |
| *F16H 3/72* | (2006.01) |
| *F16H 37/10* | (2006.01) |

(52) U.S. Cl.
CPC ............ *B60W 10/10* (2013.01); *B60W 20/00* (2013.01); *E02F 3/283* (2013.01); *F16H 61/16* (2013.01); *F16H 3/728* (2013.01); *F16H 2037/104* (2013.01); *F16H 2061/163* (2013.01); *F16H 2200/2007* (2013.01); *F16H 2200/2035* (2013.01)

(58) Field of Classification Search
CPC ............... F16H 3/728; F16H 2037/104; F16H 2200/2007; F16H 2200/2035; F16H 61/16; F16H 2061/163
USPC ............................................ 701/50; 414/685
See application file for complete search history.

(56) References Cited

U.S. PATENT DOCUMENTS

| | | | | |
|---|---|---|---|---|
| 7,524,268 | B2* | 4/2009 | Oka | B60K 28/08 477/169 |
| 7,613,560 | B2* | 11/2009 | Nishi | F16H 61/423 340/441 |
| 2004/0242368 | A1* | 12/2004 | Tabata | F16H 3/663 475/296 |
| 2005/0020398 | A1* | 1/2005 | Tabata | F16H 3/663 475/269 |
| 2005/0071068 | A1 | 3/2005 | Funato et al. | |
| 2007/0129214 | A1* | 6/2007 | Kondo | F16H 61/0437 477/144 |
| 2008/0182696 | A1 | 7/2008 | Sah et al. | |
| 2008/0315559 | A1* | 12/2008 | Murakami | A01B 67/00 280/446.1 |
| 2009/0005941 | A1 | 1/2009 | DeMarco et al. | |
| 2009/0105028 | A1 | 4/2009 | Hiraki et al. | |
| 2009/0270212 | A1* | 10/2009 | Ueda | F16H 47/04 475/74 |
| 2010/0152981 | A1* | 6/2010 | Nishi | F16H 61/423 701/50 |
| 2011/0257851 | A1* | 10/2011 | Uematsu | B60T 8/175 701/50 |
| 2012/0065854 | A1 | 3/2012 | Stoller et al. | |
| 2012/0296530 | A1* | 11/2012 | Hyodo | E02F 9/202 701/50 |
| 2012/0296531 | A1* | 11/2012 | Hyodo | E02F 9/2079 701/50 |
| 2012/0296532 | A1* | 11/2012 | Murakami | F02D 31/001 701/50 |
| 2012/0322615 | A1* | 12/2012 | Matsuzaki | F16H 61/0246 477/79 |
| 2013/0157806 | A1* | 6/2013 | Koyama | B60W 20/30 477/5 |
| 2013/0173123 | A1* | 7/2013 | Oouchida | B60W 10/06 701/50 |
| 2013/0332035 | A1* | 12/2013 | Shioiri | F02D 29/00 701/50 |
| 2014/0379226 | A1* | 12/2014 | Ishida | F16D 67/06 701/50 |
| 2016/0017570 | A1* | 1/2016 | Miyamoto | B60W 10/188 414/685 |
| 2016/0251828 | A1* | 9/2016 | Miyamoto | E02F 9/2079 701/22 |

FOREIGN PATENT DOCUMENTS

| | | |
|---|---|---|
| JP | 2004-353685 A | 12/2004 |
| JP | 2005-119645 A | 5/2005 |
| JP | 2006-329244 A | 12/2006 |
| JP | 2009-14201 A | 1/2009 |
| JP | 2013-537962 A | 10/2013 |

OTHER PUBLICATIONS

The Office Action for the corresponding Chinese application No. 201480026531.6 dated Jul. 4, 2016.
The extended European search report for the corresponding European application No. 14870866.2, issued on May 9, 2017.

* cited by examiner

WORK VEHICLE AND METHOD OF CONTROLLING WORK VEHICLE

CROSS-REFERENCE TO RELATED APPLICATIONS

This application is a U.S. National stage application of International Application No. PCT/JP2014/081110, filed on Nov. 25, 2014. This U.S. National stage application claims priority under 35 U.S.C. §119(a) to Japanese Patent Application No. 2013-259381, filed in Japan on Dec. 16, 2013, the entire contents of which are hereby incorporated herein by reference.

BACKGROUND

Field of the Invention

The present invention relates to a work vehicle and a method of controlling the work vehicle.

Background Information

Among work vehicles, such as a wheel loader, a type of work vehicle equipped with a power transmission including a torque converter and a multistage gearbox (hereinafter referred to as "a torque converter type transmission") has been widely known. On the other hand, in recent years, HMTs (hydro-mechanical transmissions) and EMTs (electro-mechanical transmissions) have been known as power transmissions that supersede the torque converter type transmissions.

As disclosed in Japan Laid-open Patent Application Publication No. 2006-329244, the HMTs include a gear mechanism and a motor connected to a rotary element of the gear mechanism. The HMTs are configured to convert part of a driving force from an engine into a hydraulic pressure and transmit the hydraulic pressure to a travelling apparatus, and is also configured to mechanically transmit the remainder of the driving force to the travelling apparatus.

To enable continuously variable speed change, the HMTs include, for instance, a planetary gear mechanism and a hydraulic motor. Among three elements composed of a sun gear, a carrier and a ring gear in the planetary gear mechanism, a first element is coupled to an input shaft, and a second element is coupled to an output shaft. Additionally, a third element is coupled to a hydraulic motor. The hydraulic motor is configured to function as either a motor or a pump in accordance with a travelling condition of the work vehicle. The HMTs are configured to continuously variably change the rotational speed of the output shaft by changing the rotational speed of the hydraulic motor.

On the other hand, the EMTs use an electric motor instead of the hydraulic motor used in the HMTs. The electric motor is configured to function as either a motor or an electric generator in accordance with a travelling condition of the work vehicle. Similarly to the HMTs, the EMTs are configured to continuously variably change the rotational speed of the output shaft by changing the rotational speed of the electric motor.

SUMMARY

Some of HMTs or EMTs are capable of switching a power transmission path between two modes. It has been known that such a type of HMTs or EMTs configured to switch a plurality of modes can perform a wide range of speed ratio with a relatively small power transmission. Among the two modes, one is a mode for low speed travelling (hereinafter referred to as "a low speed (Lo) mode"), and the other is a mode for high speed travelling (hereinafter referred to as "a high speed (Hi) mode"). In general, mode switching is performed by engaging or disengaging clutches for establishing connection to the respective settings of transmission path. For example, the modes are switched in accordance with the speed ratio of the power transmission. The Lo mode is set when the speed ratio is less than or equal to a predetermined mode switching threshold. The Hi mode is set when the speed ratio is greater than the mode switching threshold.

At this time, the speed ratio of a work vehicle may vary around the mode switching threshold due to the influence of the aforementioned clutch engagement/disengagement. FIG. 16 shows variation in mode of the power transmission path in such a case. In an example of FIG. 16, at time t1, a clutch corresponding to the Hi mode is disengaged, whereas another clutch corresponding to the Lo mode is engaged. Shocks herein caused in clutch switching result in occurrences of acute variation in torsion amount of shafts inside a gear mechanism, variation in angle of gears due to backlash, and variation in torsion amount of tires. As a result, variation in speed ratio occurs at or after time t1.

In the example of FIG. 16, until time t1, the speed ratio is greater than or equal to a mode switching threshold Rs_th1, and hence, the Hi mode is set. In a period from time t1 to time t2, the speed ratio is less than or equal to the mode switching threshold Rs_th1, and hence, the Lo mode is set. In a period from time t2 to time t3, the speed ratio is greater than or equal to the mode switching threshold Rs_th1, and hence, the Hi mode is set. At or after time t3, the speed ratio is less than or equal to the mode switching threshold Rs_th1, and hence, the Lo mode is set.

Thus, vibrations of the vehicle body are induced by variation in passing torque that passes through the power transmission and by acute reduction in clutch relative rotational speed to 0 in clutch engagement. As a result, an operator increasingly feels uncomfortable.

It is an object of the present invention to provide a work vehicle having a power transmission of an HMT or EMT type and a plurality of settings of transmission path for a driving force which inhibits hunting to be caused by frequently switching between the settings of transmission path, and to provide a method of controlling the work vehicle.

A work vehicle according to a first aspect of the present invention includes an engine, a hydraulic pump, a work implement, a travelling apparatus, a power transmission, a controller and an operating device. The hydraulic pump is configured to be driven by the engine. The work implement is configured to be driven by a hydraulic oil discharged from the hydraulic pump. The travelling apparatus is configured to be driven by the engine. The power transmission is configured to transmit a driving force from the engine to the travelling apparatus. The controller is configured to control the power transmission. The operating device is configured to be operated by an operator.

The power transmission includes an input shaft, an output shaft, a gear mechanism, a motor, a first clutch and a second clutch. The gear mechanism has a planetary gear mechanism and is configured to transmit a rotation of the input shaft to the output shaft. The motor is connected to a rotary element of the planetary gear mechanism. The first clutch is configured to switch a transmission path for the driving force in the power transmission into a first mode. The second clutch is configured to switch the transmission path for the driving force in the power transmission into a second mode. When the transmission path is set in the first mode, the first clutch is configured to be engaged and the second clutch is configured to be disengaged. When the transmission path is set in the second mode, the second clutch is configured to be engaged and the first clutch is configured to be disengaged.

In the power transmission, a rotational speed of the motor varies, thereby a speed ratio of the output shaft to the input shaft varies. When a speed ratio parameter corresponding to the speed ratio is a predetermined mode switching threshold, a rotational speed ratio of the motor to the input shaft in the first mode and a rotational speed ratio of the motor to the input shaft in the second mode becomes equal.

The controller includes a trigger operation detecting unit, a timer and a clutch controlling unit. The clutch controlling unit is configured to switch the transmission path from one to the other of the first and second modes when the speed ratio parameter reaches the mode switching threshold. The trigger operation detecting unit is configured to detect whether or not a predetermined operation is performed by the operator. The timer is configured to measure a period of time elapsed from a first point of time at which the transmission path is switched into the other mode. The clutch controlling unit is configured to keep setting the transmission path in the other mode even when the speed ratio parameter again reaches the mode switching threshold until a switching prohibition period expires as long as the elapsed period of time is included in the switching prohibition period. The switching prohibition period has a predetermined initial value. The trigger operation detecting unit is configured to make the switching prohibition period expire when detecting the predetermined operation in the switching prohibition period.

One of a first range, which is a range in which the speed ratio parameter is greater than or equal to the mode switching threshold, and a second range, which is a range in which the speed ratio parameter is less than or equal to the mode switching threshold, may be defined as an admissible range whereas the other of the first range and the second range may be defined as an inadmissible range. Additionally, the controller may be configured to perform a control of making the speed ratio parameter equal to the mode switching threshold when the speed ratio parameter belongs to the inadmissible range at a second point of time that the switching prohibition period expires. Moreover, the clutch controlling unit may be configured to switch the transmission path into the one mode when the speed ratio parameter is made equal to the mode switching threshold.

The operating device may include a brake operating member. Additionally, the predetermined operation may be an operation of changing an operating amount of the brake operating member by a predetermined first amount of change or greater.

The operating device may include an accelerator operating member. Additionally, the predetermined operation may be an operation of changing an operating amount of the accelerator operating member by a predetermined second amount of change or greater.

The operating device may include a forward/rearward movement switch operating member. Additionally, the predetermined operation may be an operation of moving the forward/rearward movement switch operating member to a position different from a position thereof located at the first point of time.

The operating device may include a gearshift operating member. Additionally, the predetermined operation may be an operation of operating the gearshift operating member to shift into a gear stage different from a gear stage set at the first point of time.

The gearshift operating member may be a shift range lever. Additionally, the predetermined operation may be an operation of moving the shift range lever to a position different from a position thereof located at the first point of time.

The gearshift operating member may be a kick down button. Additionally, the predetermined operation may be an operation of pressing down the kick down button.

A work vehicle according to a second aspect of the present invention includes an engine, a hydraulic pump, a work implement, a travelling apparatus, a power transmission and a controller. The hydraulic pump is configured to be driven by the engine. The work implement is configured to be driven by a hydraulic oil discharged from the hydraulic pump. The travelling apparatus is configured to be driven by the engine. The power transmission is configured to transmit a driving force from the engine to the travelling apparatus. The controller is configured to control the power transmission.

The power transmission includes an input shaft, an output shaft, a gear mechanism, a motor, a first clutch and a second clutch. The gear mechanism has a planetary gear mechanism and is configured to transmit a rotation of the input shaft to the output shaft. The motor is connected to a rotary element of the planetary gear mechanism. The first clutch is configured to switch a transmission path for the driving force in the power transmission into a first mode. The second clutch is configured to switch the transmission path for the driving force in the power transmission into a second mode. When the transmission path is set in the first mode, the first clutch is configured to be engaged and the second clutch is configured to be disengaged. When the transmission path is set in the second mode, the second clutch is configured to be engaged and the first clutch is configured to be disengaged.

In the power transmission, a speed ratio of the output shaft to the input shaft varies when a rotational speed of the motor varies. When a speed ratio parameter corresponding to the speed ratio is a predetermined mode switching threshold, a rotational speed ratio of the motor to the input shaft in the first mode and a rotational speed ratio of the motor to the input shaft in the second mode may become equal.

The controller includes a timer, a speed ratio variation detecting unit and a clutch controlling unit. The clutch controlling unit is configured to switch the transmission path from one to the other of the first and second modes when the speed ratio parameter reaches the mode switching threshold. The timer is configured to measure a period of time elapsed from a first point of time at which the transmission path is switched into the other mode. The speed ratio variation detecting unit is configured to detect whether or not the speed ratio parameter deviates from a predetermined third range including the mode switching threshold. The clutch controlling unit is configured to keep setting the transmission path in the other mode even when the speed ratio parameter again reaches the mode switching threshold until a switching prohibition period expires as long as the elapsed period of time is included in the switching prohibition period. The switching prohibition period has a predetermined initial value. The speed ratio variation detecting unit is configured to make the switching prohibition period expire when detecting deviation of the speed ratio parameter from the third range including the mode switching threshold.

The controller may be configured to perform a control of making the speed ratio parameter equal to the mode switching threshold after the switching prohibition period is made expire due to deviation of the speed ratio parameter from the third range. Additionally, the clutch controlling unit may be configured to switch the transmission path into the one mode when the speed ratio parameter is made equal to the mode switching threshold.

One of a first range, which is a range in which the speed ratio parameter is greater than or equal to the mode switching threshold, and a second range, which is a range in which the speed ratio parameter is less than or equal to the mode switching threshold, may be defined as an admissible range, whereas the other of the first range and the second range may be defined as an inadmissible range. Additionally, where the first range is defined as the admissible range, the speed ratio variation detecting unit may be configured to set a range of greater than or equal to a value that is less than the mode switching threshold by a predetermined value as the third range. On the other hand, where the second range is defined as the admissible range, the speed ratio variation detecting unit may be configured to set a range of less than or equal to a value that is greater than the mode switching threshold by a predetermined value as the third range.

In the work vehicle according to the second aspect of the present invention, one of a first range, which is a range in which the speed ratio parameter is greater than or equal to the mode switching threshold, and a second range, which is a range in which the speed ratio parameter is less than or equal to the mode switching threshold, may be defined as an admissible range, whereas the other of the first range and the second range may be defined as an inadmissible range. Additionally, the controller may be configured to perform a control of making the speed ratio parameter equal to the mode switching threshold when the speed ratio parameter belongs to the inadmissible range at a second point of time that the switching prohibition period expires. Moreover, the clutch controlling unit may be configured to switch the transmission path into the one mode when the speed ratio parameter is made equal to the mode switching threshold.

A control method according to a third aspect of the present invention is a method of controlling a work vehicle equipped with a power transmission. The power transmission includes an input shaft, an output shaft, a gear mechanism, a motor, a first clutch and a second clutch. The gear mechanism has a planetary gear mechanism and is configured to transmit a rotation of the input shaft to the output shaft. The motor is connected to a rotary element of the planetary gear mechanism. The first clutch is configured to switch a transmission path for a driving force in the power transmission into a first mode. The second clutch is configured to switch the transmission path for the driving force in the power transmission into a second mode. When the transmission path is set in the first mode, the first clutch is configured to be engaged and the second clutch is configured to be disengaged. When the transmission path is set in the second mode, the second clutch is configured to be engaged and the first clutch is configured to be disengaged.

In the power transmission, a speed ratio of the output shaft to the input shaft varies when a rotational speed of the motor varies. When a speed ratio parameter corresponding to the speed ratio is a predetermined mode switching threshold, a rotational speed ratio of the motor to the input shaft in the first mode and a rotational speed ratio of the motor to the input shaft in the second mode may become equal.

The method includes the following five actions. The first action is an action of switching the transmission path from one to the other of the first and second modes when the speed ratio parameter reaches the mode switching threshold. The second action is an action of detecting whether or not a predetermined operation is performed by an operator. The third action is an action of measuring a period of time elapsed from a first point of time at which the transmission path is switched into the other mode. The fourth action is an action of keeping setting the transmission path in the other mode even when the speed ratio parameter again reaches the mode switching threshold until a switching prohibition period expires as long as the elapsed period of time is within the switching prohibition period. The switching prohibition period has a predetermined initial value. The fifth action is an action of making the switching prohibition period expire when the predetermined operation is detected in the switching prohibition period.

A control method according to a fourth aspect of the present invention is a method of controlling a work vehicle equipped with a power transmission. The power transmission includes an input shaft, an output shaft, a gear mechanism, a motor, a first clutch and a second clutch. The gear mechanism has a planetary gear mechanism and is configured to transmit a rotation of the input shaft to the output shaft. The motor is connected to a rotary element of the planetary gear mechanism. The first clutch is configured to switch a transmission path for a driving force in the power transmission into a first mode. The second clutch is configured to switch the transmission path for the driving force in the power transmission into a second mode. When the transmission path is set in the first mode, the first clutch is configured to be engaged and the second clutch is configured to be disengaged. When the transmission path is set in the second mode, the second clutch is configured to be engaged and the first clutch is configured to be disengaged.

In the power transmission, a speed ratio of the output shaft to the input shaft varies when a rotational speed of the motor varies. When a speed ratio parameter corresponding to the speed ratio is a predetermined mode switching threshold, a rotational speed ratio of the motor to the input shaft in the first mode and a rotational speed ratio of the motor to the input shaft in the second mode may become equal.

The control method includes the following five actions. The first action is an action of switching the transmission path from one to the other of the first and second modes when the speed ratio parameter reaches the mode switching threshold. The second action is an action of measuring a period of time elapsed from a first point of time at which the transmission path is switched into the other mode. The third action is an action of detecting whether or not the speed ratio parameter deviates from a predetermined third range including the mode switching threshold. The fourth action is an action of keeping setting the transmission path in the other mode even when the speed ratio parameter again reaches the mode switching threshold until a switching prohibition period expires as long as the elapsed period of time is within the switching prohibition period. The switching prohibition period has a predetermined initial value. The fifth action is an action of making the switching prohibition period expire when deviation of the speed ratio parameter from the third range including the mode switching threshold is detected.

According to the present invention, the clutch controlling unit is configured to keep setting the transmission path in the other mode even when the speed ratio parameter reaches the mode switching threshold in the switching prohibition period until the switching prohibition period expires. Therefore, mode switching is inhibited from being frequently performed even in a condition that the speed ratio fluctuates around the mode switching threshold in a short period of time. Consequently, it is possible to provide a work vehicle having a power transmission of an HMT or EMT type and a plurality of settings of transmission path for a driving force which inhibits hunting to be caused by frequently switching between the settings of transmission path, and to provide a method of controlling the work vehicle.

DESCRIPTION OF EXEMPLARY EMBODIMENTS

First Exemplary Embodiment

Figure 1:
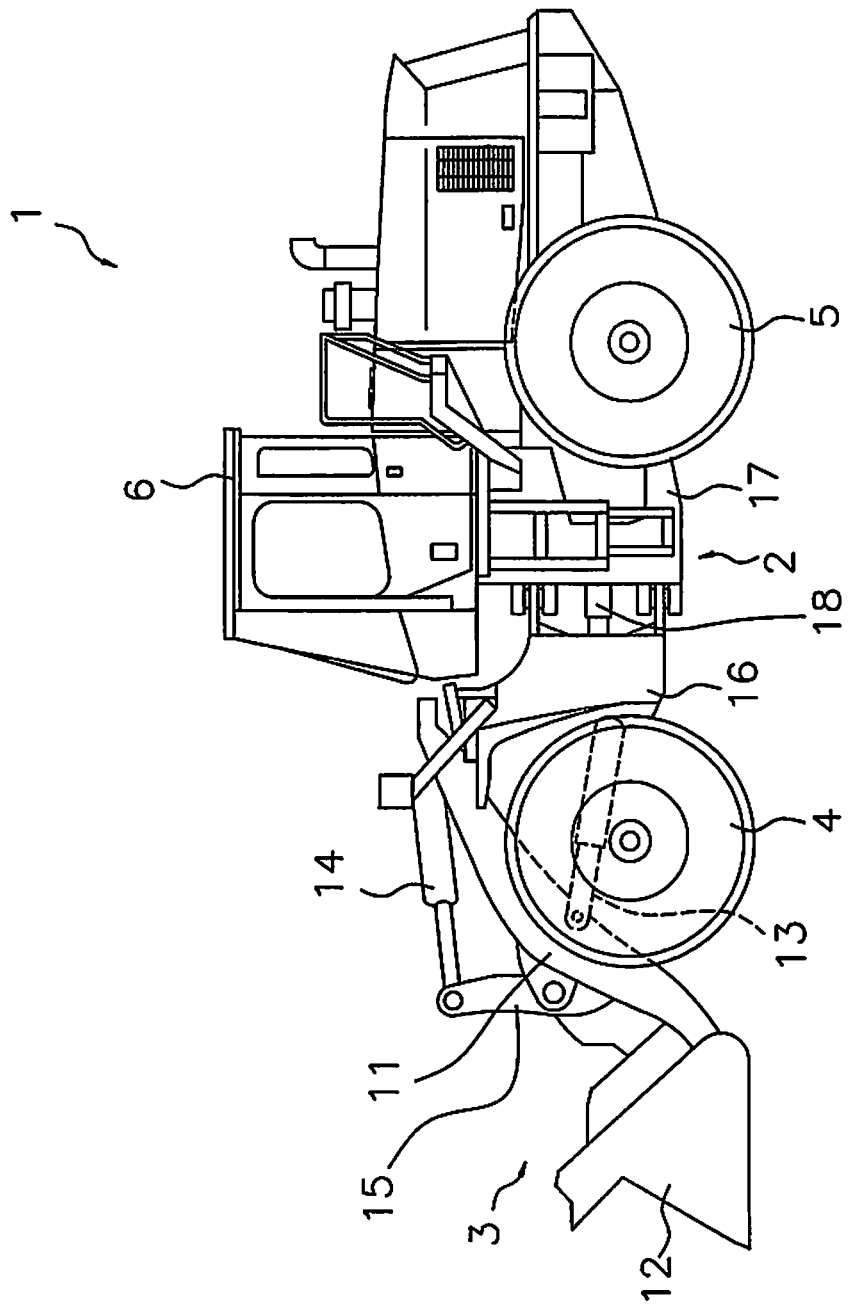
FIG. 1 is a side view of a work vehicle according to an exemplary embodiment.

An exemplary embodiment of the present invention will be hereinafter explained with reference to drawings. FIG. 1 is a side view of a work vehicle 1 according to the exemplary embodiment of the present invention. As shown in FIG. 1, the work vehicle 1 includes a vehicle body frame 2, a work implement 3, travelling wheels 4 and 5, and a cab 6. The work vehicle 1 is a wheel loader and is configured to travel when the travelling wheels 4 and 5 are driven and rotated. The work vehicle 1 is capable of performing works, such as digging, with use of the work implement 3.

The vehicle body frame 2 includes a front frame 16 and a rear frame 17. The front frame 16 and the rear frame 17 are attached to each other to be capable of pivoting in the right-and-left direction. The work implement 3 and the travelling wheels 4 are attached to the front frame 16. The work implement 3 is driven by hydraulic oil from a work implement pump 23 to be described (see FIG. 2). The work implement 3 includes a boom 11 and a bucket 12. The boom 11 is mounted to the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the front frame 16. The other end of the lift cylinder 13 is attached to the boom 11. When the lift cylinder 13 is extended and contracted by the hydraulic oil from the work implement pump 23, the boom 11 is configured to turn up and down. The bucket 12 is attached to the tip end of the boom 11. One end of the bucket cylinder 14 is attached to the vehicle body frame 2. The other end of the bucket cylinder 14 is attached to the bucket 12 through a bellcrank 15. When the bucket cylinder 14 is extended and contracted by the hydraulic oil from the work implement pump 23, the bucket 12 is configured to turn up and down.

The cab 6 and the travelling wheels 5 are attached to the rear frame 17. The cab 6 is mounted onto the vehicle body frame 2. A seat on which an operator is seated, an operating device to be described and so forth are disposed within the cab 6.

The work vehicle 1 includes a steering cylinder 18. The steering cylinder 18 is attached to the front frame 16 and the rear frame 17. The steering cylinder 18 is a hydraulic cylinder. When the steering cylinder 18 is extended and contracted by the hydraulic oil from a steering pump 28 to be described, the moving direction of the work vehicle 1 is configured to be changed right and left.

Figure 2:
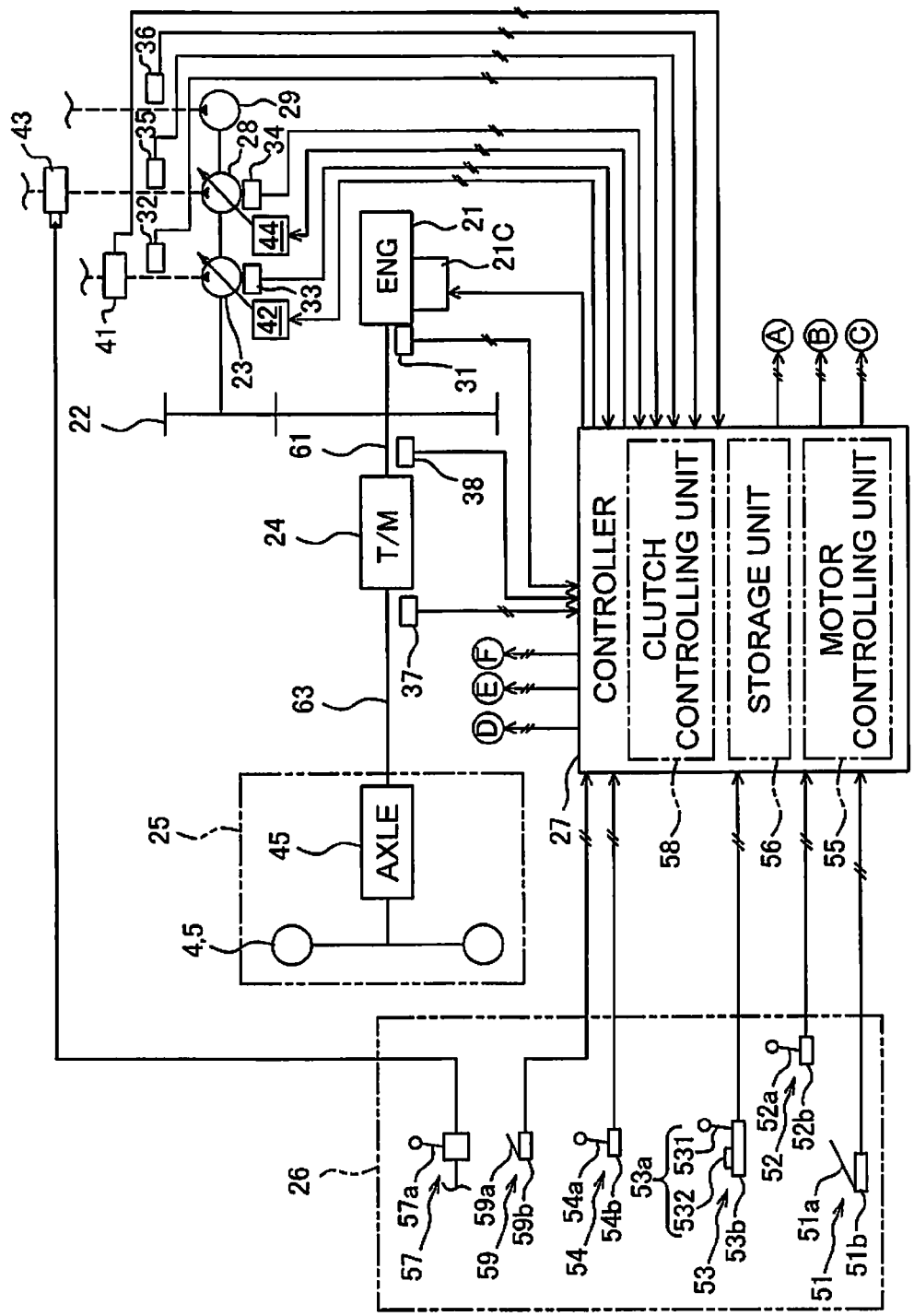
FIG. 2 is a schematic diagram showing a structure of the work vehicle.

FIG. 2 is a schematic diagram of a structure of the work vehicle 1. As shown in FIG. 2, the work vehicle 1 includes an engine 21, a PTO 22, a power transmission 24, a travelling apparatus 25, an operating device 26, a controller 27 and so forth.

The engine 21 is, for instance, a diesel engine. The output of the engine 21 is controlled by regulating the amount of fuel to be injected into the cylinder of the engine 21. The controller 27 controls a fuel injection device 21C attached to the engine 21 to regulate amount of fuel. The work vehicle 1 includes an engine rotational speed detecting unit 31. The engine rotational speed detecting unit 31 is configured to detect an engine rotational speed and transmit a detection signal indicating the engine rotational speed to the controller 27.

The work vehicle 1 includes the work implement pump 23, the steering pump 28 and a transmission pump 29. The work implement pump 23, the steering pump 28 and the transmission pump 29 are hydraulic pumps. The power take-off (PTO) 22 is configured to transmit part of a driving force from the engine 21 to these hydraulic pumps 23, 28 and 29. In other words, the PTO 22 is configured to distribute the driving force from the engine 21 to these hydraulic pumps 23, 28 and 29 and the power transmission 24.

The work implement pump 23 is driven by the driving force from the engine 21. The hydraulic oil discharged from the work implement pump 23 is supplied to the aforementioned lift cylinder 13 and bucket cylinder 14 through a work implement control valve 41. The work vehicle 1 includes a work implement pump pressure detecting unit 32. The work implement pump pressure detecting unit 32 is configured to detect the discharge pressure of the hydraulic oil from the work implement pump 23 (hereinafter referred to as "a work implement pump pressure") and transmit a detection signal indicating the work implement pump pressure to the controller 27.

The work implement pump 23 is a variable displacement hydraulic pump. The discharge volume of the work implement pump 23 is changed by changing the tilt angle of either a swashplate or a tilting shaft of the work implement pump 23. A first displacement control device 42 is connected to the work implement pump 23. The first displacement control device 42 is controlled by the controller 27 and is configured to change the tilt angle of the work implement pump 23. Accordingly, the discharge volume of the work implement pump 23 is controlled by the controller 27. For example, the first displacement control device 42 is configured to regulate the tilt angle of the work implement pump 23 such that a pressure differential between the both sides of the work implement control valve 41 can be constant. Additionally, the first displacement control device 42 is capable of arbitrarily changing the tilt angle of the work implement pump 23 in response to a command signal from the controller 27. When described in detail, the first displacement control device 42 includes a first valve and a second valve, both of which are not shown in the drawings. When the hydraulic oil to be supplied to the work implement 3 is changed by the aforementioned work implement control valve 41, a pressure differential is generated between the discharge pressure of the work implement pump 23 and the pressure on the outlet side of the work implement control valve 41 in accordance with change in opening degree of the work implement control valve 41. When controlled by the controller 27, the first valve is configured to regulate the tilt angle of the work implement pump 23 such that the pressure differential between the both sides of the work implement control valve 41 can be constant even when the load of the work implement 3 fluctuates. On the other hand, when controlled by the controller 27, the second valve is capable of further changing the tilt angle of the work implement pump 23. The work vehicle 1 includes a first tilt angle detecting unit 33. The first tilt angle detecting unit 33 is configured to detect the tilt angle of the work implement pump 23 and transmit a detection signal indicating the tilt angle to the controller 27.

The steering pump 28 is driven by the driving force form the engine 21. The hydraulic oil discharged from the steering pump 28 is supplied to the aforementioned steering cylinder 18 through a steering control valve 43. The work vehicle 1 includes a steering pump pressure detecting unit 35. The steering pump pressure detecting unit 35 is configured to detect the discharge pressure of the hydraulic oil from the steering pump 28 (hereinafter referred to as "a steering pump pressure") and transmit a detection signal indicating the steering pump pressure to the controller 27.

The steering pump 28 is a variable displacement hydraulic pump. The discharge volume of the steering pump 28 is changed by changing the tilt angle of either a swashplate or a tilting shaft of the steering pump 28. A second displacement control device 44 is connected to the steering pump 28. The second displacement control device 44 is controlled by the controller 27 and is configured to change the tilt angle of the steering pump 28. Accordingly, the discharge volume of the steering pump 28 is controlled by the controller 27. The work vehicle 1 includes a second tilt angle detecting unit 34.

The second tilt angle detecting unit 34 is configured to detect the tilt angle of the steering pump 28 and transmit a detection signal indicating the tilt angle to the controller 27.

The transmission pump 29 is driven by the driving force from the engine 21. The transmission pump 29 is a fixed displacement hydraulic pump. The hydraulic oil discharged from the transmission pump 29 is supplied to clutches CF, CR, CL and CH of the power transmission 24 through clutch control valves VF, VR, VL and VH to be described. The work vehicle 1 may include a transmission pump pressure detecting unit 36. The transmission pump pressure detecting unit 36 is configured to detect the discharge pressure of the hydraulic oil from the transmission pump 29 (hereinafter referred to as "a transmission pump pressure") and transmit a detection signal indicating the transmission pump pressure to the controller 27.

The PTO 22 is configured to transmit part of the driving force form the engine 21 to the power transmission 24. The power transmission 24 is configured to transmit the driving force from the engine 21 to the travelling apparatus 25. The power transmission 24 is configured to change the speed of the driving force from the engine 21 and output the speed-changed driving force. The structure of the power transmission 24 will be explained below in detail.

The travelling apparatus 25 includes an axle 45 and the travelling wheels 4 and 5. The axle 45 is configured to transmit the driving force from the power transmission 24 to the travelling wheels 4 and 5. The travelling wheels 4 and 5 are thereby rotated. The work vehicle 1 includes an output rotational speed detecting unit 37 and an input rotational speed detecting unit 38. The output rotational speed detecting unit 37 is configured to detect the rotational speed of an output shaft 63 of the power transmission 24 (hereinafter referred to as "an output rotational speed"). The output rotational speed corresponds to the vehicle speed. Hence, the output rotational speed detecting unit 37 is configured to detect the vehicle speed by detecting the output rotational speed. The input rotational speed detecting unit 38 is configured to detect the rotational speed of an input shaft 61 of the power transmission 24 (hereinafter referred to as "an input rotational speed"). The output rotational speed detecting unit 37 is configured to transmit a detection signal indicating the output rotational speed to the controller 27. The input rotational speed detecting unit 38 is configured to transmit a detection signal indicating the input rotational speed to the controller 27.

It should be noted that instead of the output rotational speed detecting unit 37 and the input rotational speed detecting unit 38, another rotational speed detecting unit may be provided for detecting the rotational speed of a rotary component inside the power transmission 24 and transmitting the detected rotational speed to the controller 27, and the controller 27 may be configured to calculate the input rotational speed and the output rotational speed on the basis of the rotational speed of the notary component.

The operating device 26 is operated by the operator. The operating device 26 includes an accelerator operating device 51, a work implement operating device 52, a gearshift operating device 53, a forward/rearward movement switch operating device 54, a steering operating device 57, and a brake operating device 59.

The accelerator operating device 51 includes an accelerator operating member 51a and an accelerator operation detecting unit 51b. The accelerator operating member 51a is operated for setting a target rotational speed of the engine 21. The accelerator operation detecting unit 51b is configured to detect the operating amount of the accelerator operating member 51a (hereinafter referred to as "an accelerator operating amount"). The accelerator operating amount means the pressed-down amount of the accelerator operating member 51a. The accelerator operation detecting unit 51b is configured to transmit a detection signal indicating the accelerator operating amount to the controller 27.

The work implement operating device 52 includes a work implement operating member 52a and a work implement operation detecting unit 52b. The work implement operating member 52a is operated for activating the work implement 3. The work implement operation detecting unit 52b is configured to detect the position of the work implement operating member 52a. For example, the work implement operation detecting unit 52b is configured to detect the position of the work implement operating member 52a by converting the tilt angle of the work implement operating member 52a into a corresponding electric signal. The work implement operation detecting unit 52b is configured to output a detection signal indicating the position of the work implement operating member 52a to the controller 27.

The gearshift operating device 53 includes a gearshift operating member 53a and a gearshift operation detecting unit 53b. The operator is capable of selecting one of gear stages of the power transmission 24 by operating the gearshift operating member 53a. The gearshift operation detecting unit 53b is configured to detect a gear stage specified by the gearshift operating member 53a. The gearshift operation detecting unit 53b is configured to output a detection signal indicating the gear stage specified by the gearshift operating member 53a to the controller 27.

The gearshift operating member 53a includes at least either of a shift range lever 531 and a kick down button 532. The gearshift operation detecting unit 53b is configured to detect which one of the first to N-th stages (N is a natural number) is specified on the basis of the position of the shift range lever 531, and is configured to output a detection signal indicating the gear stage specified by the shift range lever 531 to the controller 27. When detecting pressing of the kick down button 532, the gearshift operation detecting unit 53b is configured to output a detection signal, indicating a gear stage that is lower by one stage than the gear stage currently specified by the shift range lever 531, to the controller 27 for a predetermined period of time. After the predetermined period of time elapses, the gearshift operation detecting unit 53b is configured to output a detection signal indicating the gear stage specified by the shift range lever 531 to the controller 27. It should be noted that when the vehicle speed of the work vehicle 1 is lower than a predetermined threshold, a detection signal, indicating not the gear stage lower by one stage than the gear stage currently specified by the shift range lever 531 but the first stage, may be outputted to the controller 27 for the predetermined period of time. It should be noted that relations among the respective gear stages and both of the traction force and the vehicle speed of the work vehicle 1 will be described below.

The forward/rearward movement switch operating device 54 includes a forward/rearward movement switch operating member 54a and a forward/rearward movement switch operation detecting unit 54b. The operator is capable of switching between forward movement and rearward movement of the work vehicle 1 by operating the forward/rearward movement switch operating member 54a. The forward/rearward movement switch operation detecting unit 54b is configured to detect the position of the forward/rearward movement switch operating member 54a. The forward/rearward movement switch operation detecting unit 54b is configured to output a detection signal indicating a forward movement command or a rearward movement command based on the position of the forward/rearward movement switch operating member 54a to the controller 27.

The steering operating device 57 includes a steering operating member 57a. The steering operating device 57 is configured to drive the steering control valve 43 by supplying a pilot hydraulic pressure to the steering control valve 43 on the basis of an operation of the steering operating member 57a. The operator is capable of changing the moving direction of the work vehicle 1 right and left by operating the steering operating member 57a. It should be noted that the steering operating device 57 may be configured to drive the steering control valve 43 by converting the operation of the steering operating member 57a into an electric signal.

The brake operating device 59 includes a brake operating member 59a and a brake operation detecting unit 59b. The operator causes the work vehicle 1 to generate a braking force by activating a brake device (not shown in the drawing) by operating the brake operating member 59a. The brake operation detecting unit 59b is configured to detect the operating amount of the brake operating member 59a (hereinafter referred to as "a brake operating amount"). The brake operating amount means the pressed-down amount of the brake operating member 59a. The brake operation detecting unit 59b is configured to output a detection signal indicating the operating amount of the brake operating member 59a to the controller 27.

The controller 27 includes an arithmetic logic unit, such as a CPU, and memories, such as a RAM and a ROM, and is configured to perform a variety of processing for controlling the work vehicle 1. Additionally, the controller 27 includes a motor controlling unit 55 and a clutch controlling unit 58, which are units for controlling the power transmission 24, and a storage unit 56. The control of the power transmission 24 will be explained below in detail. The storage unit 56 stores a variety of programs and data for controlling the work vehicle 1.

The controller 27 is configured to transmit a command signal indicating a command throttle value to the fuel injection device 21C such that the target rotational speed of the engine 21 can be achieved in accordance with the accelerator operating amount. The controller 27 is configured to control the work implement control valve 41 on the basis of the detection signal from the work implement operation detecting unit 52b to control the hydraulic pressures to be supplied to the hydraulic cylinders 13 and 14b. Accordingly, the hydraulic cylinders 13 and 14 are extended and contracted, and the work implement 3 is activated.

Figure 3:
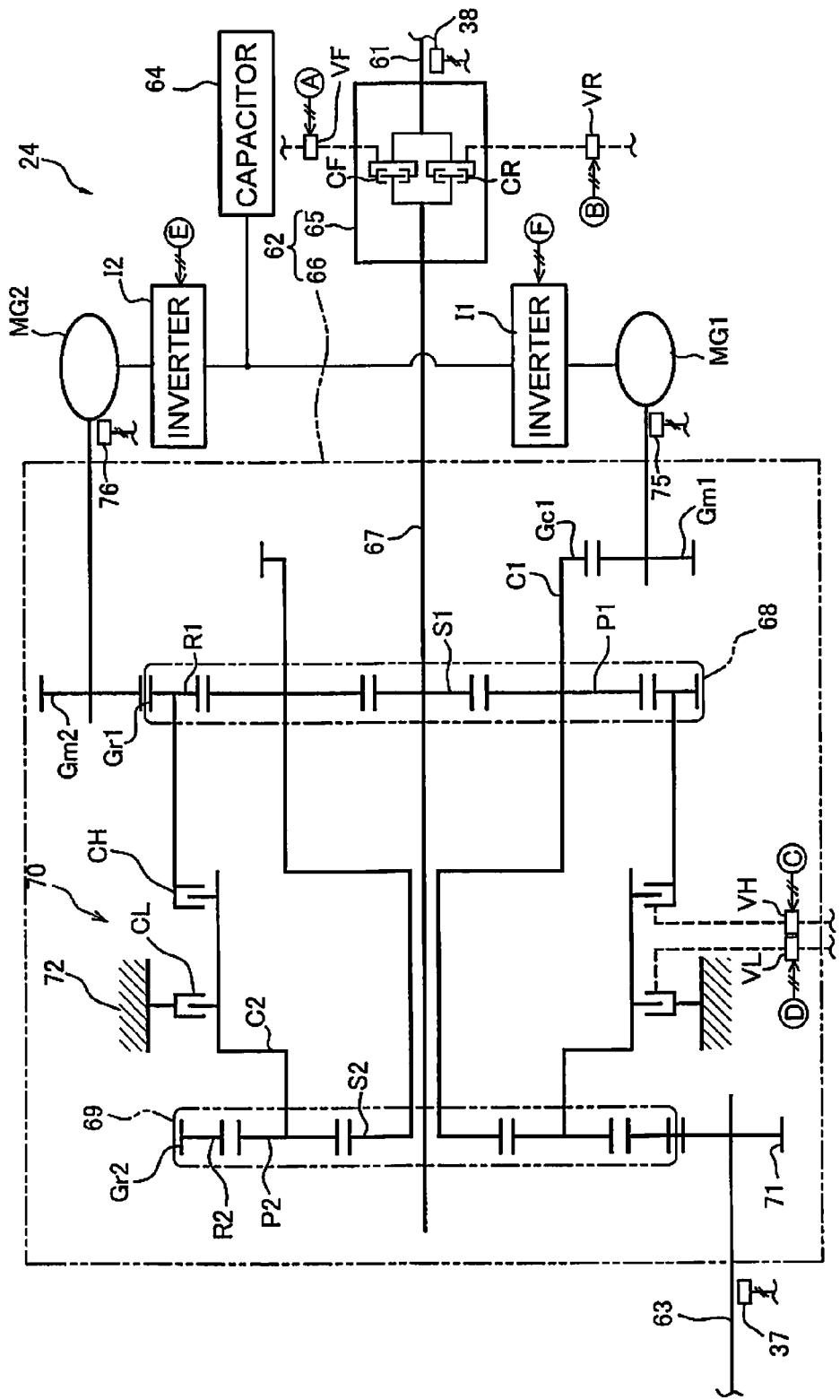
FIG. 3 is a schematic diagram showing a structure of a power transmission.

Next, the structure of the power transmission 24 will be explained in detail. FIG. 3 is a schematic diagram showing the structure of the power transmission 24. As shown in FIG. 3, the power transmission 24 includes the input shaft 61, a gear mechanism 62, the output shaft 63, a first motor MG1, a second motor MG2 and a capacitor 64. The input shaft 61 is connected to the aforementioned PTO 22. Rotation from the engine 21 is inputted into the input shaft 61 through the PTO 22. The gear mechanism 62 is configured to transmit the rotation of the input shaft 61 to the output shaft 63. The output shaft 63 is connected to the aforementioned travelling apparatus 25, and is configured to transmit the rotation from the gear mechanism 62 to the aforementioned travelling apparatus 25.

The gear mechanism 62 is a mechanism configured to transmit a driving force from the engine 21. The gear mechanism 62 causes speed ratio of the output shaft 63 to the input shaft 61 to vary in accordance with variation in rotational speed of the motors MG1 and MG2. The gear mechanism 62 includes a forward/rearward movement switch mechanism 65 and a gearshift mechanism 66.

The forward/rearward movement switch mechanism 65 includes the F clutch CF, the R clutch CR, and a variety of gears not shown in the drawings. The F clutch CF and the R clutch CR are hydraulic clutches, and the hydraulic oil is supplied to the respective clutches CF and CR from the transmission pump 29. The hydraulic oil to be supplied to the F clutch CF is controlled by the F clutch control valve VF. The hydraulic oil to be supplied to the R clutch CR is controlled by the R clutch control valve VR. The respective clutch control valves VF and VR are controlled by command signals from the clutch controlling unit 58. Engagement/disengagement of the F clutch CF and engagement/disengagement of the R clutch CR are switched, thereby the direction of the rotation to be outputted from the forward/rearward movement switch mechanism 65 is switched.

The gearshift mechanism 66 includes a transmission shaft 67, a first planetary gear mechanism 68, a second planetary gear mechanism 69, a Hi/Lo switch mechanism 70 and an output gear 71. The transmission shaft 67 is coupled to the forward/rearward movement switch mechanism 65.

The first planetary gear mechanism 68 includes a first sun gear S1, a plurality of first planet gears P1, a first carrier C1 supporting the plural first planet gears P1, and a first ring gear R1. The first sun gear S1 is coupled to the transmission shaft 67. The plural first planet gears P1 are meshed with the first sun gear S1 and are rotatably supported by the first carrier C1. A first carrier gear Gc1 is provided on the outer peripheral part of the first carrier C1. The first ring gear R1 is meshed with the plural first planet gears P1 and is also rotatable. Additionally, a first ring outer peripheral gear Gr1 is provided on the outer periphery of the first ring gear R1.

The second planetary gear mechanism 69 includes a second sun gear S2, a plurality of second planet gears P2, a second carrier C2 supporting the plural second planet gears P2, and a second ring gear R2. The second sun gear S2 is coupled to the first carrier C1. The plural second planet gears P2 are meshed with the second sun gear S2 and are rotatably supported by the second carrier C2. The second ring gear R2 is meshed with the plural second planet gears P2 and is also rotatable. A second ring outer peripheral gear Gr2 is provided on the outer periphery of the second ring gear R2. The second ring outer peripheral gear Gr2 is meshed with the output gear 71, and the rotation of the second ring gear R2 is outputted to the output shaft 63 through the output gear 71.

The Hi/Lo switch mechanism 70 is a mechanism for selectively switching a driving force transmission path in the power transmission 24 between a first mode and a second mode. In the present exemplary embodiment, the first mode is a high speed mode (a Hi mode) in which the vehicle speed is high, whereas the second mode is a low speed mode (a Lo mode) in which the vehicle speed is low. The present Hi/Lo switch mechanism 70 includes the H clutch CH configured to be engaged in the Hi mode and the L clutch CL configured to be engaged in the Lo mode. The H clutch CH is configured to connect or disconnect the first ring gear R1 and the second carrier C2. On the other hand, the L clutch CL is configured to connect or disconnect the second carrier C2 and a stationary end 72, and is thus configured to prevent or allow rotation of the second carrier C2.

It should be noted that the respective clutches CH and CL are hydraulic clutches, and the hydraulic oil is supplied to the respective clutches CH and CL separately from the transmission pump 29. The hydraulic oil to be supplied to the H clutch CH is controlled by the H clutch control valve VH. The hydraulic oil to be supplied to the L clutch CL is controlled by the L clutch control valve VL. The respective clutch control valves VH and VL are controlled by command signals from the clutch controlling unit 58.

The first motor MG1 and the second motor MG2 function as drive motors configured to generate a driving force by electric energy. Additionally, the first motor MG1 and the second motor MG2 also function as generators configured to generate electric energy with use of a driving force to be inputted thereto. The first motor MG1 is configured to function as the generator when a command signal is given thereto from the motor controlling unit 55 such that a torque acts on the first motor MG1 in the opposite direction to the rotational direction of the first motor MG1. A first motor gear Gm1 is fixed to the output shaft of the first motor MG1, and is meshed with the first carrier gear Gc1. In other words, the first motor MG1 is connected to a rotary element of the first planetary gear mechanism 68.

A first inverter I1 is connected to the first motor MG1, and a motor command signal for controlling the motor torque of the first motor MG1 is given to the first inverter I1 from the motor controlling unit 55. The rotational speed of the first motor MG1 is detected by a first motor rotational speed detecting unit 75. The first motor rotational speed detecting unit 75 is configured to transmit a detection signal indicating the rotational speed of the first motor MG1 to the controller 27.

The second motor MG2 is configured similarly to the first motor MG1. A second motor gear Gm2 is fixed to the output shaft of the second motor MG2, and is meshed with the first ring outer peripheral gear Gr1. In other words, the second motor MG2 is connected to a rotary element of the first planetary gear mechanism 68. Additionally, a second inverter I2 is connected to the second motor MG2, and a motor command signal for controlling the motor torque of the second motor MG2 is given to the second inverter I2 from the motor controlling unit 55. The rotational speed of the second motor MG2 is detected by a second motor rotational speed detecting unit 76. The second motor rotational speed detecting unit 76 is configured to transmit a detection signal indicating the rotational speed of the second motor MG2 to the controller 27.

The capacitor 64 functions as an energy storage for storing energy to be generated by the motors MG1 and MG2. In other words, the capacitor 64 is configured to store electric power generated by each motor MG1, MG2 when each motor MG1, MG2 functions as a generator. It should be noted that a battery, functioning as another electric storage means, may be used instead of the capacitor. It should be noted that the capacitor 64 may not be provided when the motors MG1 and MG2 can be respectively driven such that one of the motors MG1 and MG2 generates electric power and the other is electrified by the electric power.

The motor controlling unit 55 is configured to receive detection signals from a variety of detecting units and give command signals, which indicate command torques of the motors MG1 and MG2, to the respective inverters I1 and I2. On the other hand, the clutch controlling unit 58 is configured to give command signals for controlling the clutch hydraulic pressures of the respective clutches CF, CR, CH and CL to the respective clutch control valves VF, VR, VH and VL. Accordingly, the gear ratio and the output torque of the power transmission 24 are controlled. The action of the power transmission 24 will be hereinafter explained.

Figure 4:
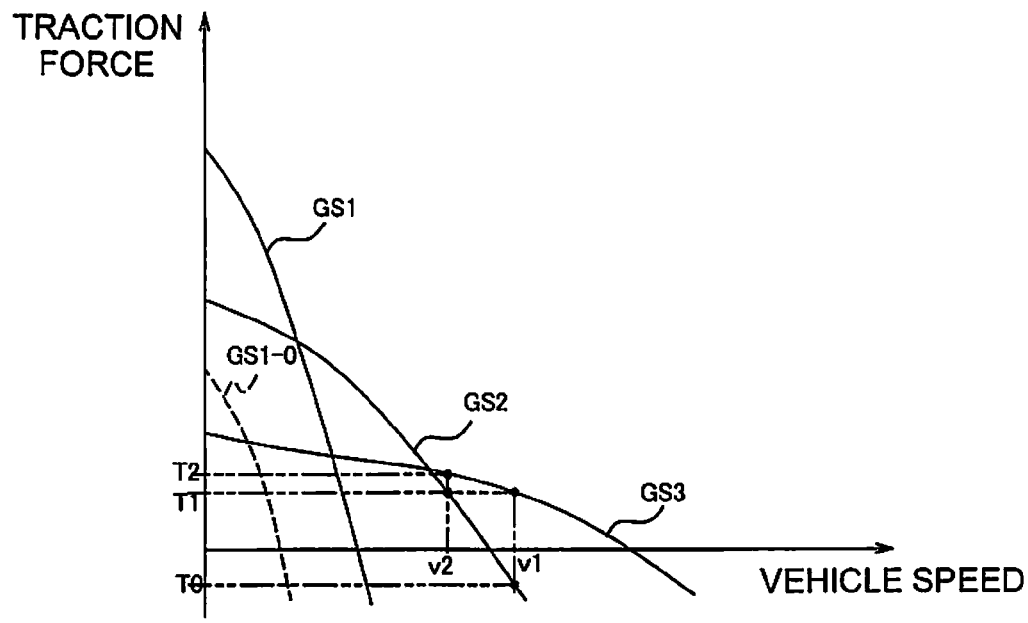
FIG. 4 is a diagram showing an example of travelling performance curves in respective gear stages of the work vehicle.

Next, explanation will be provided for relations among the respective gear stages and both of the traction force and the vehicle speed of the work vehicle 1. FIG. 4 is a diagram showing an example of travelling performance curves in the respective gear stages of the work vehicle 1. In FIG. 4, GS1, GS2 and GS3 respectively indicate the maximum traction forces in the first, second and third stages. FIG. 4 shows an example of the work vehicle 1 having three gear stages. When the work vehicle 1 has four or more gear stages, in accordance with increase in gear stage to the fourth stage and then to the fifth stage, the travelling performance curve in the set gear stage varies such that the traction force at vehicle speed 0 decreases while the vehicle speed at traction force 0 increases. It should be noted that the number of the gear stages of the work vehicle 1 is not limited to that shown in FIG. 4, and may be two or may be four or more. In FIG. 4, when the traction force is negative, this means that a force for decreasing the vehicle speed (so called engine braking or regenerative braking) is applied. Additionally, the traction force in each gear stage is increased and decreased within a range up to the maximum traction force in accordance with the accelerator pressed-down amount. In FIG. 4, GS1-0 indicates the traction force obtained when the accelerator pressed-down amount is 0 in the first stage. In FIG. 4, the traction force curve shifts from GS1-0 toward GS1 with increase in accelerator pressed-down amount. This is also true of when the gear stage is set in the second or third stage.

The controller 27 stores data of the travelling performance curves in the respective gear stages as shown in FIG. 4, and is configured to control the motors MG1 and MG2, the H clutch CH and the L clutch CL such that travelling performance can be exerted in accordance with the travelling performance curves.

Figure 5:
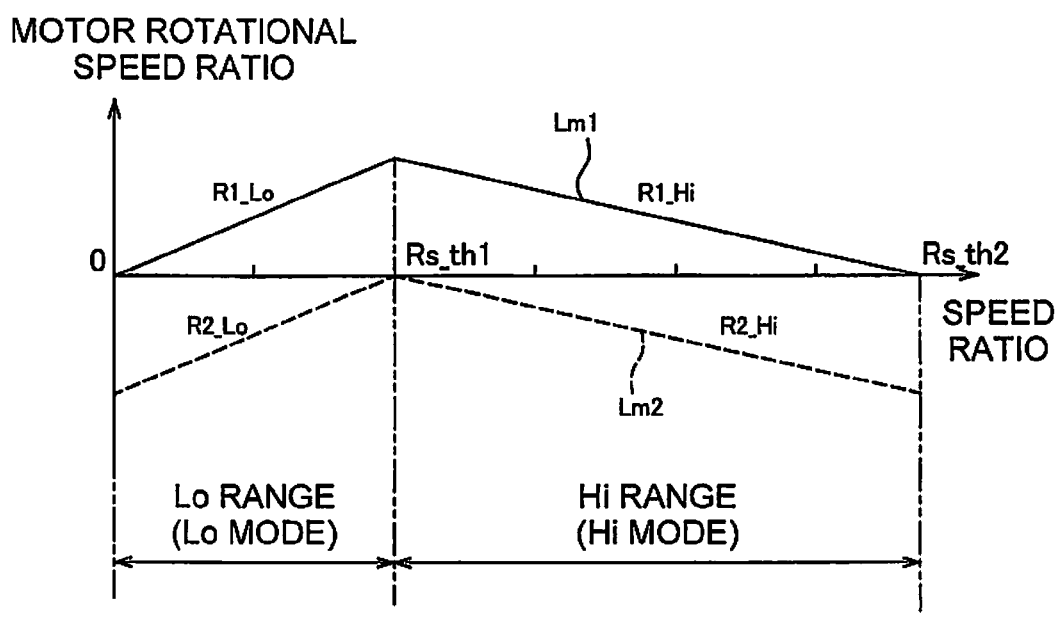
FIG. 5 is a diagram showing variation in rotational speed of a first motor and variation in rotational speed of a second motor with respect to a speed ratio of the power transmission.

Next, with FIG. 5, explanation will be provided for the schematic action performed by the power transmission 24 when the vehicle speed accelerates from 0 in a forward movement direction while the rotational speed of the engine 21 is kept constant. FIG. 5 is a diagram showing a rotational speed ratio of each motor MG1, MG2 with respect to a speed ratio of the power transmission 24. The speed ratio is an absolute value of a ratio of the rotational speed of the output shaft 63 to the rotational speed of the input shaft 61. The rotational speed ratio of the motor MG1 is a ratio of the rotational speed of the output shaft of the motor MG1 to the rotational speed of the input shaft 61. The rotational speed ratio of the motor MG2 is a ratio of the rotational speed of the output shaft of the motor MG2 to the rotational speed of the input shaft 61. When the rotational speed of the engine 21 is constant, the vehicle speed varies in accordance with the speed ratio of the power transmission 24. Therefore, in FIG. 5, variation in speed ratio of the power transmission 24 corresponds to variation in vehicle speed. In other words, FIG. 5 shows a relation between the rotational speed of each motor MG1, MG2 and the vehicle speed. In FIG. 5, a solid line Lm1 indicates the rotational speed of the first motor MG1, whereas a broken line Lm2 indicates the rotational speed of the second motor MG2.

In a Lo range (the Lo mode) that the speed ratio is greater than or equal to 0 and less than or equal to the first threshold Rs_th1, the L clutch CL is configured to be engaged whereas the H clutch CH is configured to be disengaged. The first threshold Rs_th1 is a mode switching threshold for determining mode switching. In the Lo range, the H clutch CH is configured to be disengaged, and hence, the second carrier C2 and the first ring gear R1 are configured to be disconnected. On the other hand, the L clutch CL is configured to be engaged, and hence, the second carrier C2 is configured to be fixed.

In the Lo range, the driving force from the engine 21 is inputted into the first sun gear S1 through the transmission shaft 67, and is outputted to the second sun gear S2 from the first carrier C1. On the other hand, the driving force inputted into the first sun gear S1 is transmitted to the first ring gear R1 from the first planet gears P1, and is outputted to the second motor MG2 through the first ring outer peripheral gear Gr1 and the second motor gear Gm2. During power running of the work vehicle 1, the second motor MG2 functions as a generator in the Lo range, and part of electric power generated by the second motor MG2 may be supplied to the first motor MG1. Alternatively, part of electric power generated by the second motor MG2 may be stored in the capacitor 64.

On the other hand, during power running of the work vehicle 1, in the Lo range, the first motor MG1 functions as an electric motor configured to be driven by electric power supplied from either the second motor MG2 or the capacitor 64. The driving force of the first motor MG1 is outputted to the second sun gear S2 through a path of the first motor gear Gm1, the first carrier gear Gc1, and then the first carrier C1. The driving force, outputted to the second sun gear S2 as described above, is transmitted to the output shaft 63 through a path of the second planet gears P2, the second ring gear R2, the second ring outer peripheral gear Gr2, and then the output gear 71.

Additionally, the rotational speed of the second motor MG2 becomes "0" when the speed ratio is the first threshold Rs_th1. In other words, the second motor MG2 is deactivated.

In a Hi range (the Hi mode) that the speed ratio is greater than or equal to the first threshold Rs_th1, the H clutch CH is configured to be engaged whereas the L clutch CL is configured to be disengaged. In the Hi range, the H clutch CH is configured to be engaged, and hence, the second carrier C2 and the first ring gear R1 are configured to be connected. On the other hand, the L clutch CL is configured to be disengaged, and hence, the second carrier C2 is released. Therefore, the rotational speed of the first ring gear R1 and that of the second carrier C2 becomes equal.

In the Hi range, the driving force from the engine 21 is inputted into the first sun gear S1, and is outputted to the second sun gear S2 from the first carrier C1. On the other hand, the driving force inputted into the first sun gear S1 is outputted to the first motor MG1 from the first carrier C1 through the first carrier gear Gc1 and the first motor gear Gm1. During power running of the work vehicle 1, the first motor MG1 functions as a generator in the Hi range, and hence, part of electric power generated by the first motor MG1 may be supplied to the second motor MG2. Alternatively, part of electric power generated by the first motor MG1 may be stored in the capacitor 64.

Additionally, during power running of the work vehicle 1, the second motor MG2 functions as an electric motor configured to be driven by electric power supplied from either the first motor MG1 or the capacitor 64 as needed. The driving force of the second motor MG2 is outputted to the second carrier C2 through a path of the second motor gear Gm2, the first ring outer peripheral gear Gr1, the first ring gear R1, and then the H clutch CH. The driving force, outputted to the second sun gear S2 as described above, is outputted to the second ring gear R2 through the second planet gears P2, while the driving force outputted to the second carrier C2 is outputted to the second ring gear R2 through the second planet gears P2. A net driving force, resulting from composition of the driving forces in the second ring gear R2 as described above, is transmitted to the output shaft 63 through the second ring outer peripheral gear Gr2 and the output gear 71.

Then, when the speed ratio is a second threshold Rs_th2, the rotational speed of the first motor MG1 becomes "0", and in other words, the first motor MG1 stops rotating. It should be noted that during braking of the work vehicle 1, the role of the first motor MG1 and that of the second motor MG2 are reversed. The aforementioned explanation relates to a situation of forward movement. However, a similar action is performed even in a situation of rearward movement. Additionally, the first threshold Rs_th1 and the second Rs_th2 are stored in the storage unit 56.

Next, the schematic action of the power transmission 24 will be explained with nomograms. The rotational speed and the number of teeth of the first sun gear S1 in the first planetary gear mechanism 68 are respectively set as Ns1 and Zs1. The rotational speed of the first carrier C1 is set as Nc1. The rotational speed and the number of teeth of the first ring gear R1 are respectively set as Nr1 and Zr1. On the other hand, the rotational speed and the number of teeth of the second sun gear S2 in the second planetary gear mechanism 69 are respectively set as Ns2 and Zs2. The rotational speed of the second carrier C2 is set as Nc2. The rotational speed and the number of teeth of the second ring gear R2 are respectively set as Nr2 and Zr2. With the settings, nomograms shown in FIGS. 6A-6C are obtained by representing a relation between the rotational speed and the number of teeth of each element in the first planetary gear mechanism 68 and those of each element in the second planetary gear mechanism 69.

In the nomograms, relations among the rotational speeds of the respective elements in the respective planetary gear mechanisms are depicted with straight lines. Therefore, as shown in FIGS. 6A-6C, Ns1, Nc1 and Nr1 are aligned on a straight line. Likewise, Ns2, Nc2 and Nr2 are also aligned on a straight line. It should be noted that in FIGS. 6A-6C, a solid line Lp1 indicates relations among the rotational speeds of the respective elements in the first planetary gear mechanism 68. A broken line Lp2 indicates relations among the rotational speeds of the respective elements in the second planetary gear mechanism 69.

Figure 6A:
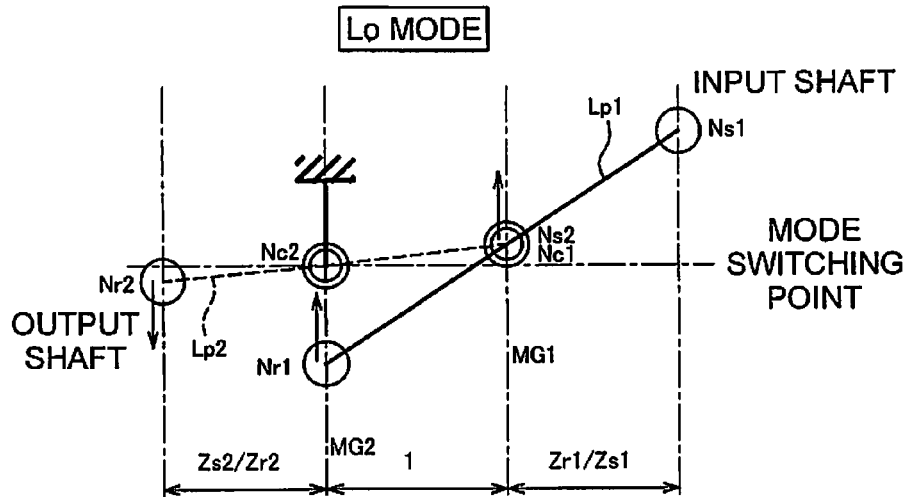
FIGS. 6A-6C include nomograms showing relations among the rotational speeds and the numbers of teeth of respective elements in a first planetary gear mechanism and those of respective elements in a second planetary gear mechanism.

FIG. 6A shows rotational speeds of the respective elements in the Lo mode. As described above, when the rotational speed of the engine 21 is set constant for easy explanation, Ns1 is set as constant. When the engine rotational direction is herein set as positive, the rotational speed Ns1 is set as positive. In a mode switching point to be described, the rotational speed of the second motor MG2 is 0. Hence, when a given rotary element is plotted on the mode switching point depicted with a dashed dotted line in the drawing, the rotational speed of the rotary element is 0. When a given rotary element is plotted in a range below the dashed dotted line of the mode switching point, the rotational speed of the rotary element is negative. In the Lo mode, increase in rotational speed of the first motor MG1 results in increase in Nc1. When Nc1 increases, Nr1 increases. Accordingly, the rotational speed of the second motor MG2 increases. Additionally, in the power transmission 24, the first carrier C1 is connected with the second sun gear S2. Therefore, Nc1 and Ns2 are equal. Thus, Ns2 also increases with increase in Nc1. In the Lo mode, the second carrier C2 is configured to be fixed to the stationary end 72. Hence, Nc2 is kept at 0. Therefore, increase in Ns2 results in decrease in Nr2. Accordingly, the speed ratio of the power transmission 24 increases. Thus, in the Lo mode, as rotational speed of the first motor MG1 increases, the speed ratio of the power transmission 24 increases.

Figure 6B:
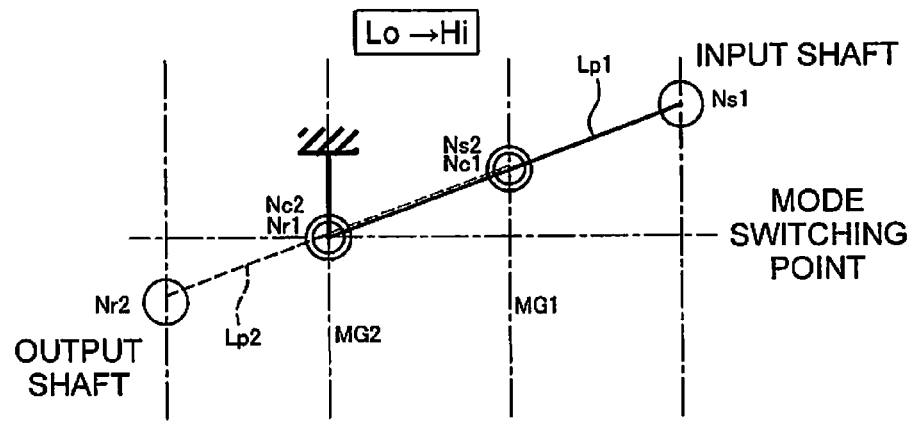
Figure 6C:
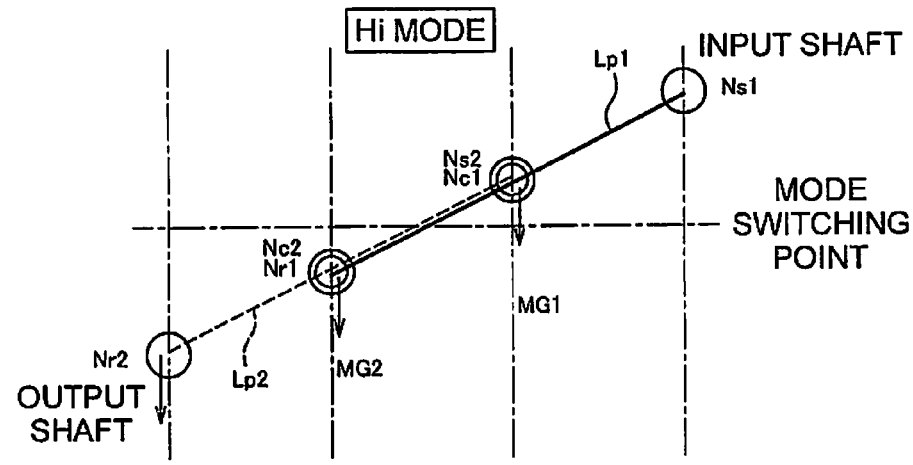

As shown in FIG. 6B, when the speed ratio of the power transmission 24 reaches the aforementioned first threshold Rs_th1, Nr1 becomes 0. Therefore, the rotational speed of the second motor MG2 becomes 0. At this time, mode switching is performed from the Lo mode to the Hi mode. In other words, the L clutch CL is configured to be switched from the engaged state to the disengaged state. Accordingly, the second carrier C2 is configured to be released from the stationary end 72 and becomes rotatable. On the other hand, the H clutch CH is configured to be switched from the disengaged state to the engaged state. Accordingly, the first ring gear R1 and the second carrier C2 are configured to be connected.

FIG. 6C shows the rotational speeds of the respective elements in the Hi mode. In the Hi mode, the first ring gear R1 and the second carrier C2 are connected, and hence, Nr1 and Nc2 are equal. Additionally, as described above, the first carrier C1 is coupled to the second sun gear S2, and hence, Nc1 and Ns2 are equal. Therefore, decrease in rotational speed of the second motor MG2 results in decrease in Nr1 and Nc2. Additionally, decrease in Nc2 results in decrease in Nr2. Accordingly, the speed ratio of the power transmission 24 increases. Thus, as rotational speed of the second motor MG2 increases, the speed ratio of the power transmission 24 increases. On the other hand, decrease in Nr1 and Nc2 results in decrease in Ns2 and Nc1. Accordingly, the rotational speed of the first motor MG1 decreases. Then, when the speed ratio of the power transmission 24 reaches the aforementioned second threshold Rs_th2, Ns2 and Nc1 become 0. Accordingly, the rotational speed of the first motor MG1 becomes 0. It should be noted that the aforementioned action is an action performed in switching from the Lo mode to the Hi mode, and an action in switching from the Hi mode to the Lo mode is performed in a reverse procedure from the aforementioned action.

As described above, when the rotational speed of the engine 21 is set constant, in other words, when the rotational speed of the input shaft 61 is set constant, in the Lo mode, the rotational speed of the first motor MG1 increases in accordance with increase in speed ratio. By contrast, in the Hi mode, the rotational speed of the first motor MG1 decreases in accordance with increase in speed ratio. Therefore, as shown in FIG. 5, in the Lo mode, the speed ratio varies at a rate of change R1_Lo with respect to the rotational speed ratio of the first motor MG1. However, in the Hi mode, the speed ratio varies at a rate of change R1_Hi, which is different from the rate of change R1_Lo in the Lo mode, with respect to the rotational speed ratio of the first motor MG1. When described in detail, the positive/negative sign for the rate of change R1_Hi in the Hi mode and that for the rate of change R1_Lo in the Lo mode are different from each other. Additionally, when the speed ratio is the first threshold Rs_th1, the rotational speed ratio of the first motor MG1 in the Lo mode and that of the first motor MG1 in the Hi mode become equal.

On the other hand, when the rotational speed of the engine 21 is set constant, in other words, when the rotational speed of the input shaft 61 is set constant, in the Lo mode, the rotational speed of the second motor MG2 increases in accordance with increase in speed ratio. In the Hi mode, the rotational speed of the second motor MG2 decreases in accordance with increase in speed ratio. Therefore, as shown in FIG. 5, in the Lo mode, the speed ratio varies at a rate of change R2_Lo with respect to the rotational speed ratio of the second motor MG2. However, in the Hi mode, the speed ratio varies at a rate of change R2_Hi, which is different from the rate of change R2_Lo in the Lo mode, with respect to the rotational speed ratio of the second motor MG2. When described in detail, the positive/negative sign for the rate of change R2_Hi in the Hi mode and that for the rate of change R2_Lo in the Lo mode are different from each other. Additionally, when the speed ratio is the first threshold Rs_th1, the rotational speed ratio of the second motor MG2 in the Lo mode and that of the second motor MG2 in the Hi mode become equal.

As described above, the clutch controlling unit 58 is configured to perform switching between the Lo mode and the Hi mode. The clutch controlling unit 58 is configured to switch the H clutch CH and the L clutch CL by transmitting clutch command signals to the H clutch control valve VH and the L clutch control valve VL. A control of switching between the Hi mode and the Lo mode will be hereinafter explained in detail.

Figure 7:
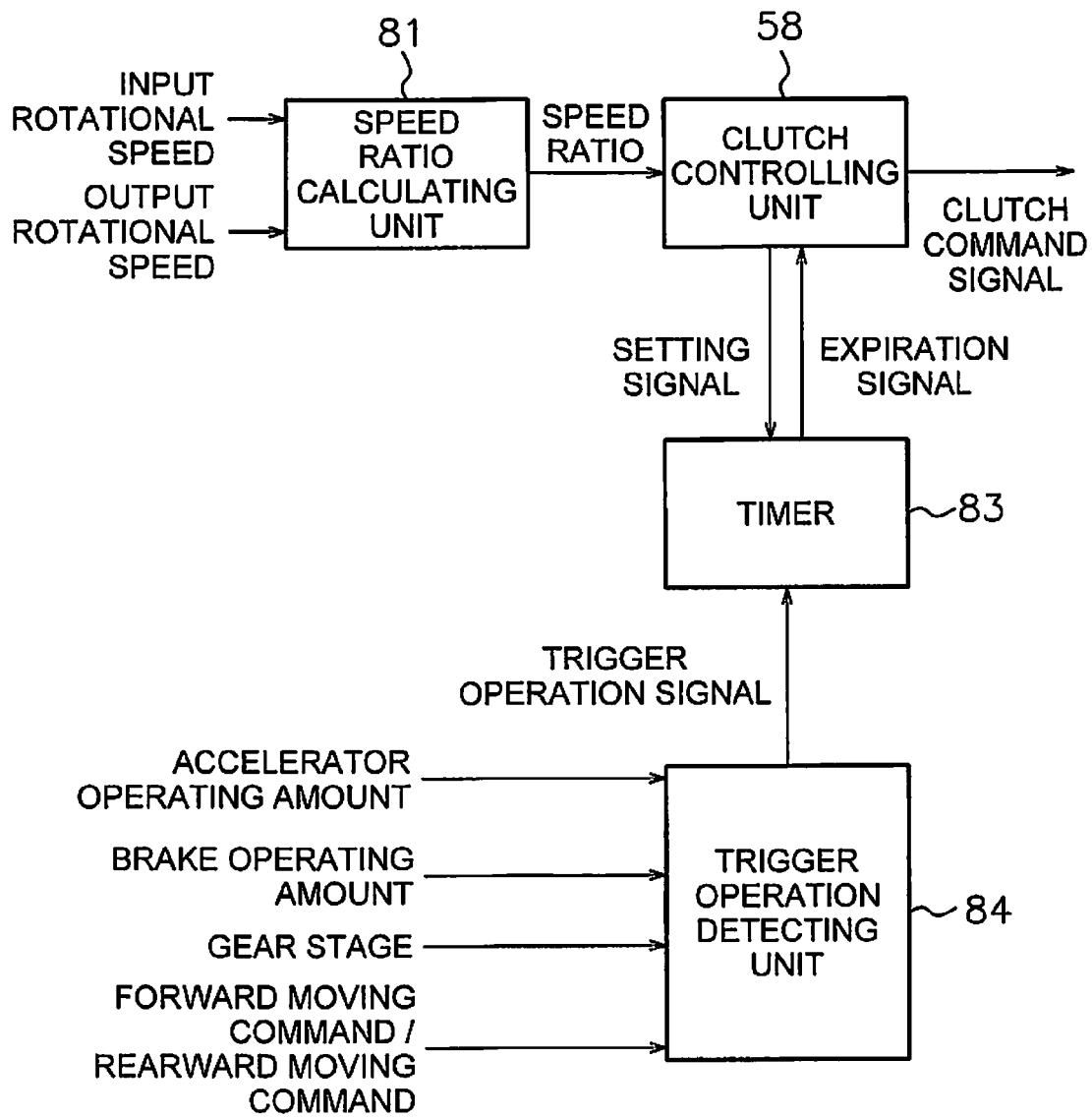
FIG. 7 is a block diagram showing a detailed internal structure of a controller according to a first exemplary embodiment.

FIG. 7 is a block diagram showing a detailed internal structure of the controller 27 according to a first exemplary embodiment. In FIG. 7, the storage unit 56 is not shown. As shown in FIG. 7, the controller 27 further includes a speed ratio calculating unit 81, a timer 83 and a trigger operation detecting unit 84.

The speed ratio calculating unit 81 is configured to calculate the speed ratio of the power transmission 24 on the basis of the input rotational speed and the output rotational speed of the power transmission 24. The input rotational speed is detected by the input rotational speed detecting unit 38. The output rotational speed is detected by the output rotational speed detecting unit 37.

The clutch controlling unit 58 is configured to obtain the speed ratio calculated by the speed ratio calculating unit 81 and switch the transmission path from one to the other of the Lo and Hi modes when the speed ratio reaches the first threshold Rs_th1. Normally, the clutch controlling unit 58 is configured to switch the transmission path into the Hi mode when the speed ratio after mode switching becomes greater than or equal to the first threshold Rs_th1. On the other hand, the clutch controlling unit 58 is configured to switch the transmission path into the Lo mode when the speed ratio after mode switching becomes less than or equal to the first threshold Rs_th1. Here, the aforementioned Hi range (a range in which the speed ratio is greater than or equal to the first threshold Rs_th1) will be referred to as a first range, whereas the aforementioned Lo range (a range in which the speed ratio is less than or equal to the first threshold Rs_th1) will be referred to as a second range. Moreover, when a given range is admissible as a range into which the speed ratio in each of the Hi and Lo modes falls, the range will be referred to as an admissible range, and otherwise, will be referred to as an inadmissible range. In the setting, the admissible range and the inadmissible range can be defined as shown in the following Table 1.

TABLE 1

|  | Hi mode | Lo mode |
| --- | --- | --- |
| First range | Admissible range | Inadmissible range |
| Second range | Inadmissible range | Admissible range |

Whether a given range is the aforementioned admissible range or the aforementioned inadmissible range is herein determined based on a criterion regarding whether or not power circulation occurs in the power transmission. In the Lo mode, when the speed ratio falls into the Lo range (the second range), as described above, the first motor MG1 functions as an electric motor whereas the second motor MG2 functions as a generator. However, in the Lo mode, to increase the speed ratio to a value in the Hi range (the first range) during power running, it is principally required that the first motor MG1 functions as a generator whereas the second motor MG2 functions as an electric motor. In this case, part of the driving force from the engine 21 and the driving force from the second motor MG2 is absorbed into the first motor MG1 through a path of the first carrier C1, the first carrier gear Gc1, and then the first motor gear Gm1. On the other hand, the remainder of the driving force is transmitted to the output shaft 63 through a path of the first carrier C1, the second sun gear S2, the second planet gears P2, the second ring gear R2, the second ring outer peripheral gear Gr2 and then the output gear 71. Therefore, the driving force causes power circulation through a path of the first carrier C1, the first carrier gear Gc1, the first motor gear Gm1, the first motor MG1, (the capacitor 64) the second motor MG2, the second motor gear Gm2, the first ring outer peripheral gear Gr1, the first ring gear R1, the first planet gears P1 and then back to the first carrier C1.

Figure 8:
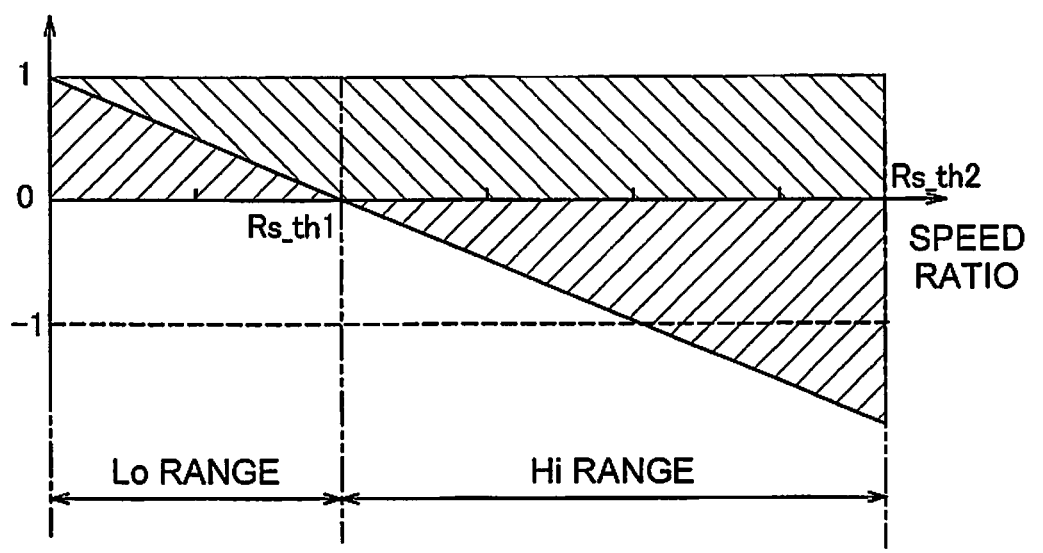
FIG. 8 is a diagram showing a relation between a power transmitted by a mechanical element and a power transmitted by an electric element in a Lo mode.

FIG. 8 is a diagram showing a relation between a power transmitted by a mechanical element and a power transmitted by an electric element in the Lo mode. The power transmitted by the mechanical element herein means a power transmitted by the gear mechanism 62 which is part of an engine output power. On the other hand, the power transmitted by the electric element means a power transmitted by one of the motors MG1 and MG2 functioning as a generator generating a power and the other of the motors MG1 and MG2 functioning as an electric motor being driven. In FIG. 8, it is assumed that a power equal to the engine output power acts on the output shaft 63 without taking into consideration that part of the engine output power is absorbed by the capacitor 64. In FIG. 8, a positive value indicates a ratio of the power transmitted by the mechanical element to the power outputted to the output shaft 63 or a ratio of the power transmitted by the electric element to the power outputted to the output shaft 63. In FIG. 8, a negative value indicates a power that is additionally required for power circulation inside the power transmission 24 other than the power outputted to the output shaft 63.

As shown in FIG. 8, in the Lo range corresponding to the second range, the power transmitted by the electric element increases as the speed ratio decreases, but power circulation does not occur. However, in the Hi range corresponding to the first range, the power transmitted by the mechanical element is all transmitted to the output shaft 63, and further, the power transmitted by the electric element is additionally required. Moreover, when the speed ratio increases, the power transmitted by the electric element increases. Therefore, a large displacement motor/generator is required for achieving increase in speed ratio. This results in not only increase in size of the power transmission 24 but also increase in energy loss inside the power transmission 24. Furthermore, a power outputted to the first carrier C1 is a net power that results from composition of the power transmitted by the mechanical element and the power transmitted by the electric element as shown in FIG. 8. Hence, when the speed ratio increases, a load acting on the first carrier C1 increases. To countermeasure this, increase in size of the first carrier C1 is required. Therefore, to avoid these drawbacks, mode switching of the power transmission 24 is performed at the mode switching threshold Rs_th1. However, when it is assumed that the speed ratio belongs to the first range (the Hi range) in the Lo mode, this condition means that mode switching should have been intrinsically done but has not been done yet. Therefore, it is inadmissible that the speed ratio belongs to the first range (the Hi range) in the Lo mode.

Consequently, in the Lo mode, the first range is defined as the inadmissible range whereas the second range is defined as the admissible range.

Next, in the Hi mode, when the speed ratio falls into the Hi range (the first range), as described above, the second motor MG2 functions as an electric motor whereas the first motor MG1 functions as a generator. However, in the Hi mode, to decrease the speed ratio to a value in the Lo range (the second range) during power running, it is principally required that the second motor MG2 functions as a generator whereas the first motor MG1 functions as an electric motor. In this case, part of the driving force from the engine 21 and the driving force from the first motor MG1 is absorbed by the second motor MG2 through a path of the first carrier C1, the second sun gear S2, the second planet gears P2, the second carrier C2, the first ring gear R1, the first ring outer peripheral gear Gr1 and then the second motor gear Gm2. On the other hand, the remainder of the driving force is transmitted to the output shaft 63 through a path of the second planet gears P2, the second ring gear R2, the second ring outer peripheral gear Gr2 and then the output gear 71. Therefore, the driving force causes power circulation through a path of the first carrier C1, the second sun gear S2, the second planet gears P2, the second carrier C2, the first ring gear R1, the first ring outer peripheral gear Gr1, the second motor gear Gm2, the second motor MG2, (the capacitor 64) the first motor MG1, the first motor gear Gm1, the first carrier gear Gc1 and then back to the first carrier C1.

Figure 9:
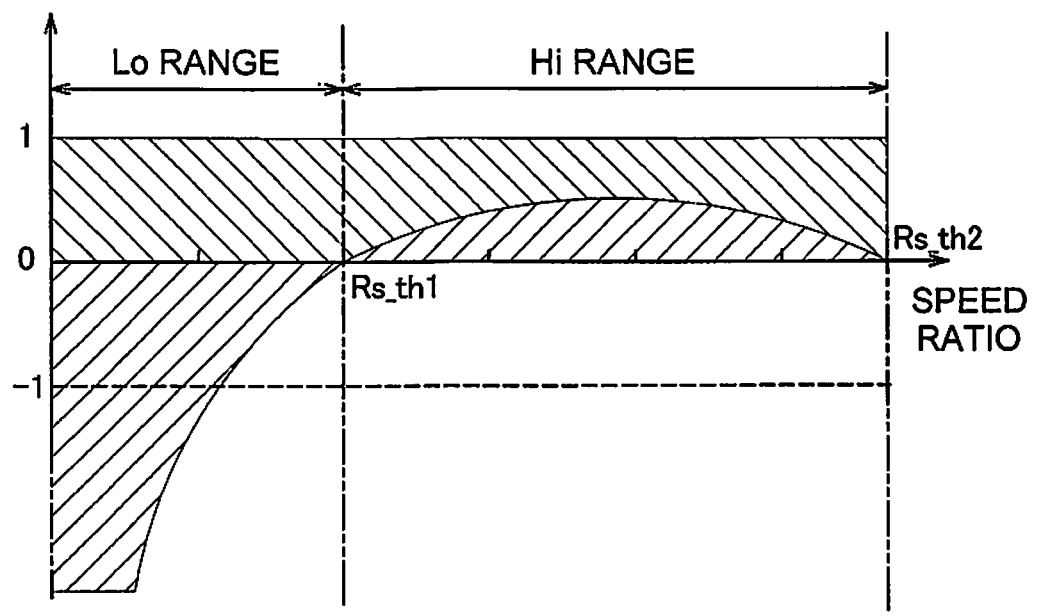
FIG. 9 is a diagram showing a relation between a power transmitted by the mechanical element and a power transmitted by the electric element in a Hi mode.

FIG. 9 is a diagram showing a relation between a power transmitted by the mechanical element and a power transmitted by the electric element in the Hi mode. The power transmitted by the mechanical element and the power transmitted by the electric element are defined the same as those in FIG. 8. In FIG. 9, it is similarly assumed that a power equal to the engine output power acts on the output shaft 63 without taking into consideration that part of the engine output power is absorbed by the capacitor 64. Additionally, negative and positive values in the vertical axis of FIG. 9 also indicate the same contents as those in the vertical axis of FIG. 8.

As shown in FIG. 9, in the Hi range corresponding to the first range, the power transmitted by the electric element varies in accordance with the value of the speed ratio, but power circulation does not occur. However, in the Lo range corresponding to the second range, the power transmitted by the electric element is required in addition to the power transmitted by the mechanical element. Moreover, when the speed ratio decreases, the power transmitted by the electric element increases. Therefore, a large displacement motor/generator is required for achieving increase in speed ratio. This results in not only increase in size of the power transmission 24 but also increase in energy loss inside the power transmission 24. Furthermore, a power outputted to the first carrier C1 is a net power that results from composition of the power transmitted by the mechanical element and the power transmitted by the electric element as shown in FIG. 9. Hence, when the speed ratio decreases, a load acting on the first carrier C1 increases. To countermeasure this, increase in size of the first carrier C1 is required. Therefore, to avoid these drawbacks, mode switching of the power transmission 24 is performed at the mode switching threshold Rs_th1. However, when it is assumed that the speed ratio belongs to the second range (the Lo range) in the Hi mode, this condition means that mode switching should have been intrinsically done but has not been done yet. Therefore, it is inadmissible that the speed ratio belongs to the second range (the Lo range) in the Hi mode. Consequently, in the Hi mode, the first range is defined as the admissible range whereas the second range is defined as the inadmissible range.

The timer 83 is configured to measure a period of time elapsed from a first point of time t1 at which the transmission path is switched into the aforementioned other mode. Specifically, the first point of time t1 is either of the points of time "a" and "b" to be described. At the first point of time t1, the clutch controlling unit 58 is configured to reset the timer 83 and output a set signal to the timer 83 for causing the timer 83 to start measuring time.

A point of time "a" after a command signal for disengaging the L clutch CL is outputted to the L clutch control valve VL and/or a command signal for engaging the H clutch CH is outputted to the H clutch control valve VH in order to switch the transmission path into the Hi mode.

A point of time "b" after a command signal for disengaging the H clutch CH is outputted to the H clutch control valve VH and/or a command signal for engaging the L clutch CL is outputted to the L clutch control valve VL in order to switch the transmission path into the Lo mode.

The timer 83 is configured to be reset in response to the set signal received from the clutch controlling unit 58, and is configured to measure a period of time elapsed from the first point of time t1. When the elapsed time exceeds the predetermined point of time, the timer 83 is configured to output an expiration signal for informing expiration of the predetermined point of time to the clutch controlling unit 58. In the following explanation, a period of time until the elapsed time exceeds the predetermined point of time is referred to as a switching prohibition period. The initial value of the switching prohibition period is preliminarily set and stored in the storage unit 56.

The trigger operation detecting unit 84 is configured to detect whether or not a predetermined operation has been performed by an operator on the basis of detection signals transmitted thereto from the operating device 26. In the following explanation, the predetermined operation will be referred to as a trigger operation. The following four operations are classified as the trigger operation:

A first operation of changing the operating amount of the brake operating member 59a (the brake operating amount) by a predetermined first amount of change $\Delta D1$ or greater within the aforementioned switching prohibition period;

A second operation of changing the operating amount of the accelerator operating member 51a (the accelerator operating amount) by a predetermined second amount of change $\Delta D2$ or greater within the aforementioned switching prohibition period;

A third operation of moving the forward/rearward movement switch operating member 54a to a position different from its position located at the aforementioned first point of time t1 within the switching prohibition period; and A fourth operation of operating the gearshift operating member 53a within the switching prohibition period to change into a gear stage different from the gear stage set at the aforementioned first point of time t1, specifically, either an operation of moving the shift range lever 531 to a position different from its position located at the aforementioned first point of time t1 within the switching prohibition period or an operation of pressing down the kick down button 532 within the switching prohibition period.

It should be noted that the aforementioned first amount of change $\Delta D1$ and the aforementioned second amount of change $\Delta D2$ are preliminarily set and stored in the storage unit 56. When detecting the trigger operation, the trigger operation detecting unit 84 is configured to output a trigger operation signal to the timer 83. When receiving the trigger operation signal, the timer 83 is configured to make the switching prohibition period expire and output the expiration signal to the clutch controlling unit 58. It should be noted that when detecting the trigger operation, the trigger operation detecting unit 84 may be configured to output the trigger operation signal to the clutch controlling unit 58. In this case, the clutch controlling unit 58 is preferably configured to determine that the switching prohibition period has expired even without receiving the expiration signal from the timer 83. In other words, when detecting the aforementioned predetermined operation in the switching prohibition period, the trigger operation detecting unit 84 is configured to make the switching prohibition period expire.

As long as the elapsed time is within the switching prohibition period, the clutch controlling unit 58 is configured to keep setting the transmission path in the aforementioned other mode even when the speed ratio again reaches the first threshold Rs_th1. In other words, when the other mode corresponds to the Lo mode, the clutch controlling unit 58 is configured to consecutively output the clutch command signals for engaging the L clutch CL to the L clutch control valve VL and consecutively output the clutch command signals for disengaging the H clutch CH to the H clutch control valve VH. On the other hand, when the other mode corresponds to the Hi mode, the clutch controlling unit 58 is configured to consecutively output the clutch command signals for engaging the H clutch CH to the H clutch control valve VH and consecutively output the clutch command signals for disengaging the L clutch CL to the L clutch control valve VL. Then, when the switching prohibition period expires, a control to be described is performed.

When the speed ratio belongs to the inadmissible range at a second point of time that the switching prohibition period expires, the controller 27 is configured to perform a control of making the speed ratio equal to the first threshold Rs_th1. To make the speed ratio equal to the first threshold Rs_th1, for instance, the clutch controlling unit 58 may be configured to loosely engage the clutch corresponding to a prospective mode to be set by mode switching (the aforementioned one mode) to produce a condition that one of the H clutch CH and the L clutch CL is engaged without slipping whereas the other of the H clutch CH and the L clutch CL is engaged while slipping. At this time, the rotational speeds of the first motor MG1 and the second motor MG2 are gradually regulated, and finally, the speed ratio becomes equal to the first threshold Rs_th1. Alternatively, the motor controlling unit 55 may be configured to control the rotational speeds of the first motor MG1 and the second motor MG2 so as to make the speed ratio equal to the first threshold Rs_th1.

Moreover, the motor controlling unit 55 may be configured to control the rotational speeds of the first motor MG1 and the second motor MG2 until a difference between the present speed ratio and the first threshold Rs_th1 falls into a predetermined range. Then, when the difference falls into the predetermined range, the clutch controlling unit 58 may be configured to loosely engage the clutch corresponding to the prospective mode to be set by mode switching (the one mode). Alternatively, the clutch controlling unit 58 may be configured to engage both of the H clutch CH and the L clutch CL without making the both clutches slip to quickly make the speed ratio equal to the first threshold Rs_th1.

When the speed ratio becomes equal to the first threshold Rs_th1 as a result of the aforementioned processing, the clutch controlling unit 58 is configured to switch the transmission path into the one mode. Specifically, the clutch controlling unit 58 is configured to output the clutch command signal for disengaging the clutch corresponding to the other mode to the clutch control valve relevant to the clutch. Then, the clutch controlling unit 58 is configured to output a clutch command signal for engaging the clutch corresponding to the one mode without making the clutch slip (for regulating a clutch pressure to a predetermined pressure or greater) to the clutch control valve relevant to the clutch.

Figure 10A:
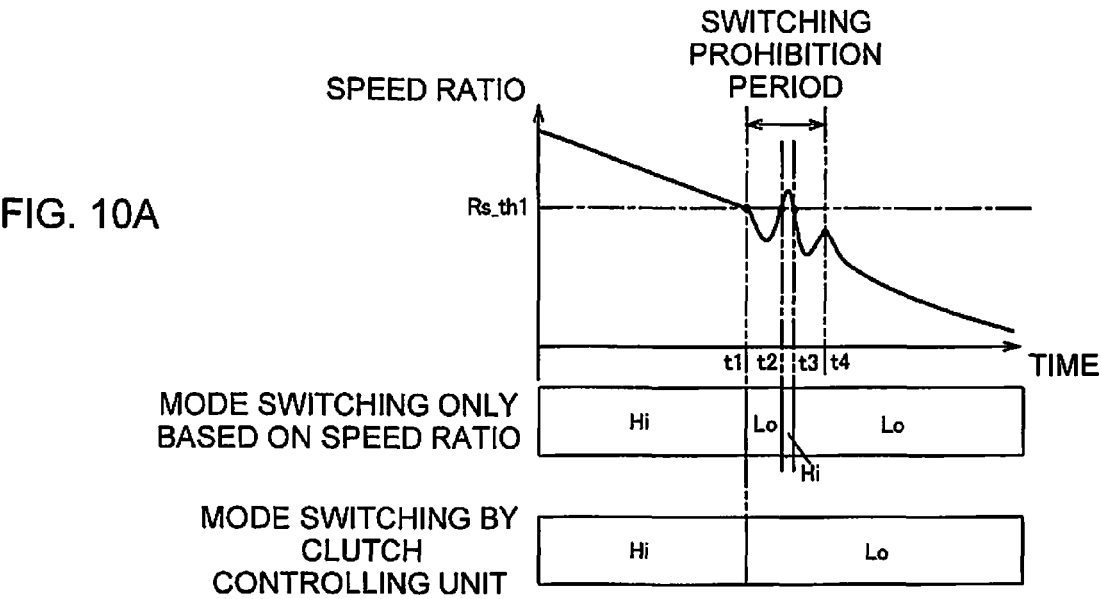
FIGS. 10A and 10B include charts respectively showing an example of time-series variation in speed ratio and mode in a condition that a trigger operation is not detected.
Figure 10B:
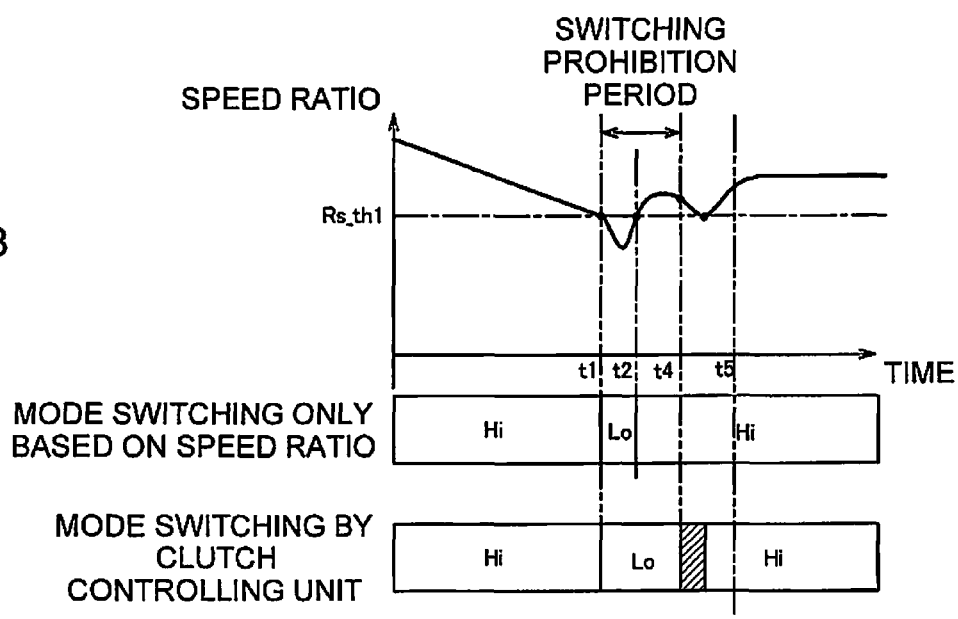

Next, an action of the clutch controlling unit 58 according to the present exemplary embodiment will be explained in detail with reference to drawings. FIGS. 10A and 10B include charts respectively showing an example of time-series variation in speed ratio and mode in a condition that the trigger operation is not detected. FIG. 10A shows a condition that the speed ratio is lower than the first threshold Rs_th1 at a point of time when the switching prohibition period expires after the transmission path is switched into the Lo mode, whereas FIG. 10B shows a condition that the speed ratio is higher than the first threshold Rs_th1 at a point of time when the switching prohibition period expires after the transmission path is switched into the Lo mode.

In both of FIGS. 10A and 10B, the speed ratio has decreased to the first threshold Rs_th1 at time t1. Let the switching prohibition period have elapsed before time t1 since switching into the Hi mode. At time t1, the clutch controlling unit 58 outputs the command signal for disengaging the H clutch CH to the H clutch control valve VH and simultaneously outputs the command signal for engaging the L clutch CL to the L clutch control valve VL in order to rapidly switch the power transmission 24 into the Lo mode. As a result, the Lo mode is actually set for the power transmission 24.

Next, in the example of FIG. 10A, the speed ratio temporarily increases and exceeds the first threshold Rs_th1 in a period from time t2 to time t3. In this case, if mode switching is performed only on the basis of the speed ratio, the transmission path is switched into the Hi mode. However, the period from time t2 to time t3 is included in the switching prohibition period. Hence, the clutch controlling unit 58 consecutively outputs the command signals for engaging the L clutch CL to the L clutch control valve VL in order to continuously keep setting the power transmission 24 in the Lo mode. Thus, the clutch controlling unit 58 consecutively outputs the command signals for engaging the L clutch CL to the L clutch control valve VL until time t4 at which the switching prohibition period expires. Then, at time t4, the speed ratio is lower than the first threshold Rs_th1. In other words, the speed ratio belongs to the admissible range. Therefore, similarly at and after time t4, the clutch controlling unit 58 consecutively outputs the command signals for engaging the L clutch CL to the L clutch control valve VL. As a result, at and after time t1, the transmission path is continuously set in the Lo mode.

On the other hand, in the example of FIG. 10B, the speed ratio becomes higher than the first threshold Rs_th1 in a period from time t2 to time t4 at which the switching prohibition period expires. However, the period from time t2 to time t4 is within the switching prohibition period. Hence, the clutch controlling unit 58 consecutively outputs the command signals for engaging the L clutch CL to the L clutch control valve VL in order to continuously keep setting the power transmission 24 in the Lo mode. Thus, the clutch controlling unit 58 consecutively outputs the command signals for engaging the L clutch CL to the L clutch control valve VL until time t4 at which the switching prohibition period expires.

However, at time t4, the speed ratio is higher than the first threshold Rs_th1, but the power transmission path is actually set in the Lo mode. In other words, the speed ratio belongs to the inadmissible range. Therefore, the controller 27 performs the following control so as to make the speed ratio equal to the first threshold Rs_th1 after time t4.

The clutch controlling unit 58 may be configured to output a command signal for engaging the H clutch CH without making the H clutch CH slip (for regulating the clutch pressure of the H clutch CH to a predetermined pressure) to the H clutch control valve VH so as to quickly return the speed ratio to the mode switching threshold Rs_th1. Alternatively, the clutch controlling unit 58 may be configured to loosely engage the H clutch CH. After the relative rotational speed of the two rotational shafts of the H clutch CH falls into a predetermined speed range, then the clutch controlling unit 58 may be configured to engage the H clutch CH without making the H clutch CH slip (at the predetermined clutch pressure) so as to return the speed ratio to the mode switching threshold Rs_th1. In other words, the clutch controlling unit 58 may be configured to output a command signal for loosely engaging the H clutch CH to the H clutch control valve VH. After the relative rotational speed of the H clutch CH falls into the predetermined speed range, then the clutch controlling unit 58 may be configured to output the command signal for engaging the H clutch CH without making the H clutch CH slip to the H clutch control valve VH. As a result, at time t5, the speed ratio reaches the first threshold Rs_th1. It should be noted that mode switching by the present clutch controlling unit is shown with hatching from time t4 to time t5, because the L clutch CL and the H clutch CH are both engaged and hence the transmission path is set in neither the Lo mode nor the Hi mode. It should be noted that instead of the aforementioned control by the clutch controlling unit 58, the motor controlling unit 55 may be configured to receive a speed ratio inputted thereto from the speed ratio calculating unit 81 and output a suitable motor command signal for making the speed ratio reach the first threshold Rs_th1. In other words, the motor controlling unit 55 may be configured to control the rotational speeds of the motors MG1, MG2 so as to make the speed ratio reach the first threshold Rs_th1. When such feedback control causes the speed ratio to become the first threshold Rs_th1, the transmission path is set in the Lo mode from time t4 to time t5.

In the example of FIG. 10B, at time t5, the speed ratio has reached the first threshold Rs_th1. As soon as time t5 that the speed ratio has reached the first threshold Rs_th1 comes, the clutch controlling unit 58 outputs the command signal for disengaging the L clutch CL to the L clutch control valve VL so as to rapidly switch the power transmission 24 into the Hi mode (the mode previously set before mode switching at time t1). As a result, at time t5, the transmission path is switched into the Hi mode.

It should be noted that transition in speed ratio as shown in FIG. 10B is unlikely to occur in normal travelling of the work vehicle 1. Next, with reference to drawings, detailed explanation will be provided for an action performed by the clutch controlling unit 58 when the trigger operation is detected in the switching prohibition period.

When no operation is performed by an operator, hunting can be roughly prevented by the countermeasure in FIGS. 10A and 10B. However, contrarily when an operation is performed by the operator, this could result in onset of power circulation that the speed ratio greatly deviates from the speed ratio range corresponding to the present mode (either of the aforementioned first and second ranges), and accordingly, shocks are induced in mode switching performed when the switching prohibition period expires. Therefore, when an operation is performed by the operator, it is desirable to make the switching prohibition period expire and causes the power transmission 24 to rapidly perform mode switching as needed.

Figure 11A:
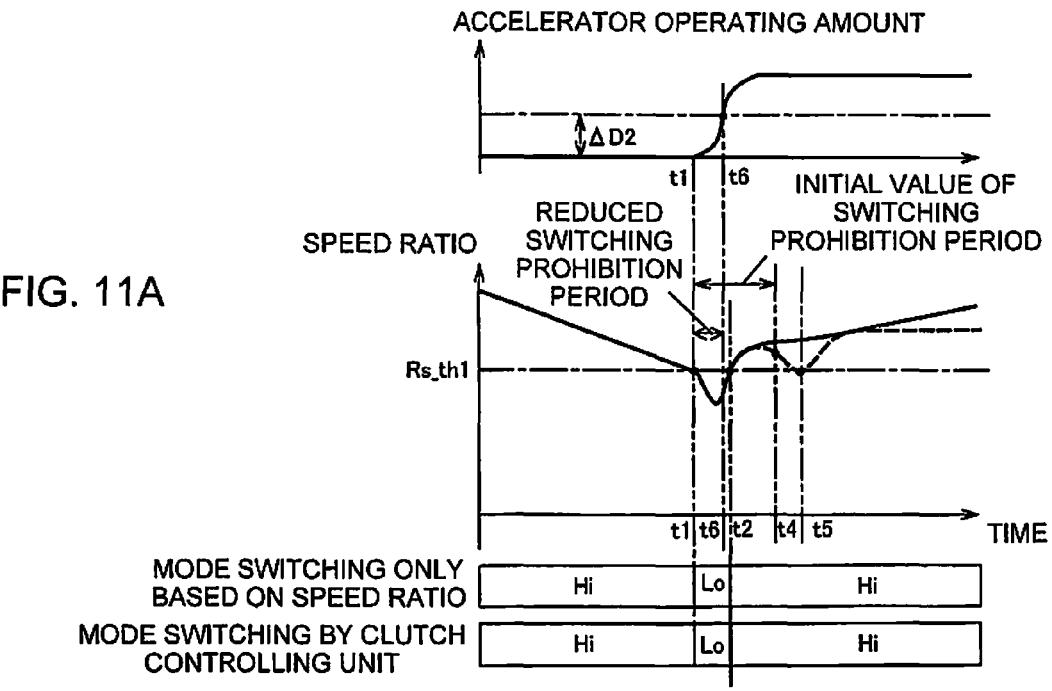
FIGS. 11A and 11B include charts respectively showing an example of time-series variation in speed ratio and mode in a condition the trigger operation is detected.
Figure 11B:
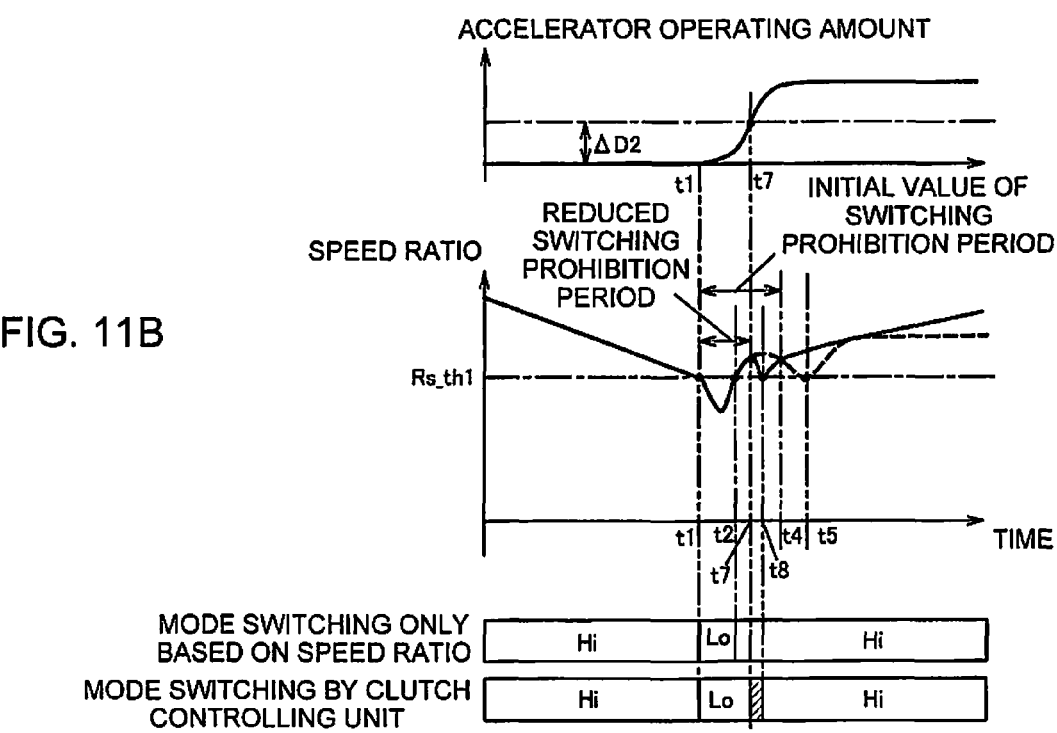

FIGS. 11A and 11B include charts respectively showing an example of time-series variation in speed ratio and mode when the trigger operation is detected. FIG. 11A shows a condition that the speed ratio becomes the first threshold Rs_th1 after the trigger operation is detected, whereas FIG. 11B shows a condition that the trigger operation is detected after the speed ratio becomes the first threshold Rs_th1. It should be noted that transition in speed ratio of FIG. 10B is depicted with a dashed line in each of FIGS. 11A and 11B for easy comparison with the action in FIG. 10B. It should be noted that the examples of FIGS. 11A and 11B will be hereinafter respectively explained with an assumption that the speed ratio varies until time t2 similarly in FIG. 10B.

In the example of FIG. 11A, a period from time t1 at which the transmission path is switched into the Lo mode to time t4 is set as the initial value of the switching prohibition period. At time t6 prior to time t2 at which the speed ratio becomes the first threshold Rs_th1, the amount of change in accelerator operating amount (an absolute value of a difference between the accelerator operating amount at time t6 and the accelerator operating amount at time t1) becomes ΔD2. In other words, at the second point of time t6 in the switching prohibition period, the trigger operation detecting unit 84 detects the trigger operation and outputs the trigger operation signal to the timer 83. When receiving the trigger operation signal, the timer 83 makes the switching prohibition period expire. Therefore, the switching prohibition period is reduced to a period from time t1 to time t6. Consequently, at and after time t6, the clutch controlling unit 58 performs a normal processing. Accordingly, at time t2, the speed ratio reaches the first threshold Rs_th1, and the clutch controlling unit 58 outputs the command signal for disengaging the L clutch CL to the L clutch control valve VL and simultaneously outputs the command signal for engaging the H clutch CH to the H clutch control valve VH to switch the power transmission 24 into the Hi mode. As a result, at time t2, the transmission path is switched into the Hi mode.

Thus, in the example of FIG. 11A, compared to the example of FIG. 10B, deceleration is not performed at and after time t4 that the switching prohibition period expires, and it is advantageous in that vibrations of the vehicle body are unlikely to be caused by acute variation in speed ratio.

On the other hand, in the example of FIG. 11B, the clutch controlling unit 58 performs a processing for the switching prohibition period in a period from time t2 and time t7 at which the amount of change in the accelerator operating amount becomes ΔD2. In other words, until time t7, the clutch controlling unit 58 consecutively outputs the command signals for engaging the L clutch CL to the L clutch control valve VL in order to continuously keep setting the power transmission 24 in the Lo mode.

At time t7 that the trigger operation is detected by the trigger operation detecting unit 84, the speed ratio becomes higher than the first threshold Rs_th1, but the transmission path is actually set in the Lo mode. In other words, the speed ratio belongs to the inadmissible range. Therefore, the controller 27 performs the following control to make the speed ratio equal to the first threshold Rs_th1 after time t7.

The clutch controlling unit 58 may be configured to output the command signal for engaging the H clutch CH without making the H clutch CH slip (for regulating the clutch pressure of the H clutch CH to the predetermined pressure) to the H clutch control valve VH so as to quickly return the speed ratio to the mode switching threshold Rs_th1. Alternatively, the clutch controlling unit 58 may be configured to loosely engage the H clutch CH. After the relative rotational speed of the two rotational shafts of the H clutch CH falls into the predetermined speed range, then the clutch controlling unit 58 may be configured to engage the H clutch CH without making the H clutch CH slip (at the predetermined clutch pressure) so as to return the speed ratio to the mode switching threshold Rs_th1. In other words, the clutch controlling unit 58 may be configured to output the command signal for loosely engaging the H clutch CH to the H clutch control valve VH. After the relative rotational speed of the H clutch CH falls into the predetermined speed range, then the clutch controlling unit 58 may be configured to output the command signal for engaging the H clutch CH without making the H clutch CH slip to the H clutch control valve VH. As a result, at time t8, the speed ratio teaches the first threshold Rs_th1. It should be noted that mode switching by the present clutch controlling unit is shown with hatching from time t7 to time t8, because the L clutch CL and the H clutch CH are both engaged and hence the transmission path is set in neither the Lo mode nor the Hi mode.

It should be noted that instead of the aforementioned control by the clutch controlling unit 58, the motor controlling unit 55 may be configured to receive a speed ratio inputted thereto from the speed ratio calculating unit 81 and output a suitable motor command signal for making the speed ratio reach the first threshold Rs_th1. In other words, the motor controlling unit 55 may be configured to control the rotational speeds of the motors MG1, MG2 so as to make the speed ratio reach the first threshold Rs_th1. When such feedback control causes the speed ratio to become the first threshold Rs_th1, the transmission path is set in the Lo mode from time t7 to time t8.

In the example of FIG. 11B, at time t8, the speed ratio has reached the first threshold Rs_th1. As soon as time t8 that the speed ratio has reached the first threshold Rs_th1 comes, the clutch controlling unit 58 outputs the command signal for disengaging the L clutch CL to the L clutch control valve VL in order to rapidly switch the power transmission 24 into the Hi mode (the mode previously set before mode switching at time t1). As a result, at time t8, the transmission path is switched into the Hi mode.

Therefore, in the example of FIG. 11B, compared to the example of FIG. 10B, the switching prohibition period is made expire earlier, and thereby, an amount of the speed ratio change in mode switching is smaller. Hence, it is herein advantageous in that shocks in mode switching are reduced. It should be noted that the switching prohibition period is supposed to be easily deactivated when the threshold ΔD2 of the amount of change in accelerator operating amount is too small. Accordingly, even when the speed ratio varies around the mode switching threshold after mode switching, it becomes difficult to inhibit further occurrence of mode switching attributed to such variation. As a result, hunting becomes likely to occur. On the other hand, when the threshold ΔD2 is too large, the switching prohibition period becomes unlikely to be deactivated. Accordingly, an operation by an operator increases the risk that the speed ratio greatly deviates from the speed ratio range corresponding to the present mode (either of the aforementioned first and second ranges) and shocks in mode switching become intense. Therefore, it is desirable to appropriately set the magnitude of the threshold ΔD2 in order to reduce hunting and shocks.

FIGS. 11A and 11B exemplify conditions that the speed ratio decreases and then increases in response to pressing down of the accelerator operating member. Contrarily to the conditions, there is also a condition that the speed ratio increases and then decreases in response to pressing down of the brake operating member. Similarly in the condition, the control by the clutch controlling unit 58 and the motor controlling unit 55 is performed with a similar method to FIGS. 11A and 11B. It is similarly desirable to appropriately set the threshold ΔD1 of the amount of change in brake operating amount in order to reduce the aforementioned hunting and shocks.

Next, explanation will be provided for a condition that the forward/rearward movement switch operating member 54a is operated. When the forward/rearward movement switch operating member 54a is moved to a position different from its position located at time t1, the clutch controlling unit 58 and the motor controlling unit 55 may perform so as to reverse the direction of the vehicle velocity of the work vehicle 1. In other words, the speed ratio acutely may vary after the forward/rearward movement switch operating member 54a is operated. Therefore, when the forward/rearward movement switch operating member 54a is moved to the position different from its position located at time t1, the trigger operation detecting unit 84 outputs the trigger operation signal to the timer 83 so as to make the switching prohibition period expire. Accordingly, a suitable mode is set for the power transmission 24 in accordance with acute variation in speed ratio caused after the forward/rearward movement switch operating member 54a is operated. Thus, when the forward/rearward movement switch operating member 54a is operated, the switching prohibition period is also made expire immediately. Hence, mode switching is performed before the speed ratio greatly deviates from the speed ratio range corresponding to the present mode (either of the aforementioned first and second ranges) in response to the operation by the operator. Therefore, as a result, shocks are alleviated that are attributed to mode switching to be performed after expiration of the switching prohibition period.

Next, explanation will be provided for a condition that the gearshift operating member 53a is operated. When the gearshift operating member 53a is operated and the gear stage is shifted, the controller 27 controls the motors MG1 and MG2, the H clutch CH, and the L clutch CL such that the work vehicle 1 can exert travelling performance in accordance with the travelling performance curves differently set depending on the gear stages as shown in FIG. 4. When the gearshift operating member 53a is operated, the controller 27 controls the motors MG1 and MG2, the H clutch CH, and the L clutch CL to enable the work vehicle 1 to exert a traction force in a post-gear shifting gear stage, the traction force corresponding to a pre-gear shifting vehicle speed. However, when the traction force is not balanced with a resistance force against the work vehicle 1 such as a resistance attributed to a friction force against the travelling surface, gravity or so forth, a point corresponding to the pre-gear shifting vehicle speed transitions to another point on a travelling performance curve corresponding to the post-gear shifting gear stage such that another traction force balanced with the resistance force can be exerted.

For example, the work vehicle 1 travels with a vehicle speed v1 and a traction force T1 as shown in FIG. 4 by maximally pressing down the accelerator operating member in the third stage set as a pre-gear shifting gear stage. Under the condition, the gear stage is shifted to the second stage. In this case, the traction force decreases to a traction force T0 corresponding to the vehicle speed v1 in the second stage. As a result, the vehicle speed inevitably decelerates to a vehicle speed v2 corresponding to the traction force T1 balanced with an external force T1. Contrarily, when the gear stage is shifted from the second stage to the third stage under the condition, a traction force T2 is larger than the external force T1, and hence, the vehicle speed inevitably accelerates to the vehicle speed v1 corresponding to the traction force T1 balanced with the external force T1.

Thus, when the gearshift operating member 53*a* is operated, then the vehicle speed often varies acutely, and in accordance with this, the speed ratio greatly varies. Therefore, when the gearshift operating member 53*a* is operated for changing into a gear stage different from the stage set at time t1, the trigger operation detecting unit 84 outputs the trigger operation signal to the timer 83 and makes the switching prohibition period expire. Accordingly, a suitable mode is set for the power transmission 24 in accordance with acute variation caused after the gearshift operating member 53*a* is operated. Thus, when the gearshift operating member 53*a* is operated, the switching prohibition period is also made expire immediately. Hence, mode switching is performed before the speed ratio greatly deviates from the speed ratio range corresponding to the present mode (either of the aforementioned first and second ranges) in response to the operation by the operator. Therefore, as a result, shocks are alleviated which are attributed to mode switching to be performed after expiration of the switching prohibition period.

Second Exemplary Embodiment

Figure 12:
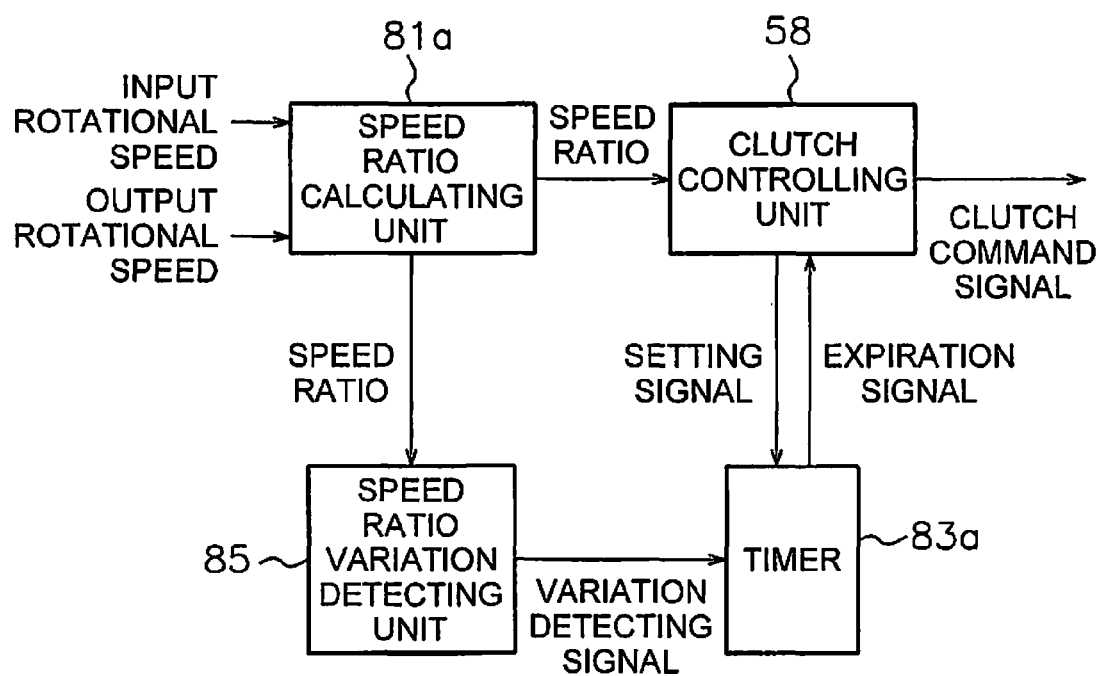
FIG. 12 is a block diagram showing a detailed internal structure of a controller according to a second exemplary embodiment.

FIG. 12 is a block diagram showing a detailed internal structure of the controller 27 according to the second exemplary embodiment. In FIG. 12, the storage unit 56 is not shown. Referring to FIG. 12, in the second exemplary embodiment, the controller 27 includes a speed ratio variation detecting unit 85 instead of the trigger operation detecting unit 84 according to the first exemplary embodiment. A speed ratio calculating unit 81*a* and a timer 83*a* are herein configured to perform roughly the same actions as their corresponding ones in the first exemplary embodiment. Hence, these constituent elements will be explained regarding differences from the first exemplary embodiment. On the other hand, the clutch controlling unit 58 is configured to perform substantially the same action as that in the first exemplary embodiment. Hence, detailed explanation thereof will not be provided.

The speed ratio calculating unit 81*a* is configured to output the speed ratio not only to the clutch controlling unit 58 but also to the speed ratio variation detecting unit 85.

The speed ratio variation detecting unit 85 is configured to receive the speed ratio outputted thereto from the speed ratio calculating unit 81*a* and detect whether or not the speed ratio deviates from a predetermined third range including the first threshold Rs_th1. When the present mode is the Hi mode, the third range is set as a range of greater than or equal to a value (Rs_th1−R) less than the first threshold Rs_th1 by a predetermined value (see FIG. 13A). On the other hand, when the present mode is the Lo mode, the third range is set as a range of less than or equal to a value (Rs_th1+R) greater than the first threshold Rs_th1 by a predetermined value (see FIG. 13B). In other words, when the aforementioned first range is defined as the admissible range, the range of greater than or equal to the value (Rs_th1−R), which is less than the first threshold Rs_th1 by the predetermined value, is set as the third range. On the other hand, when the aforementioned second range is defined as the admissible range, the range of less than or equal to the value (Rs_th1+R), which is greater than the first threshold Rs_th1 by the predetermined value, is set as the third range.

The aforementioned third range is preliminarily set and stored in the storage unit 56. When detecting deviation of the speed ratio from the third range, the speed ratio variation detecting unit 85 is configured to output a variation detection signal to the timer 83*a*. Moreover, when detecting deviation of the speed ratio from the third range, the speed ratio variation detecting unit 85 may be configured to output the variation detection signal to the clutch controlling unit 58 as well. In this case, the clutch controlling unit 58 is preferably configured to determine that the switching prohibition period has expired even without receiving the expiration signal from the timer 83*a*. In other words, when detecting deviation of the speed ratio from the third range, the speed ratio variation detecting unit 85 is configured to make the switching prohibition period expire.

Actions of the clutch controlling unit 58, herein performed when the speed ratio reaches the first threshold Rs_th1 after elapse of the switching prohibition period, are the same as those of the clutch controlling unit 58 in the first exemplary embodiment. Likewise, actions of the clutch controlling unit 58, herein performed when deviation of the speed ratio from the third range is not detected even though the speed ratio reaches the first threshold Rs_th1 in the switching prohibition period, are also the same as those of the clutch controlling unit 58 in the first exemplary embodiment (actions related to FIGS. 10A and 10B).

Next, with reference to drawings, detailed explanation will be provided for an action performed by the clutch controlling unit 58 when deviation of the speed ratio from the third range is detected in the switching prohibition period. In this case, the transmission path is rapidly switched into a mode corresponding to the speed ratio at a point of time when the speed ratio deviates from the third range.

Figure 13A:
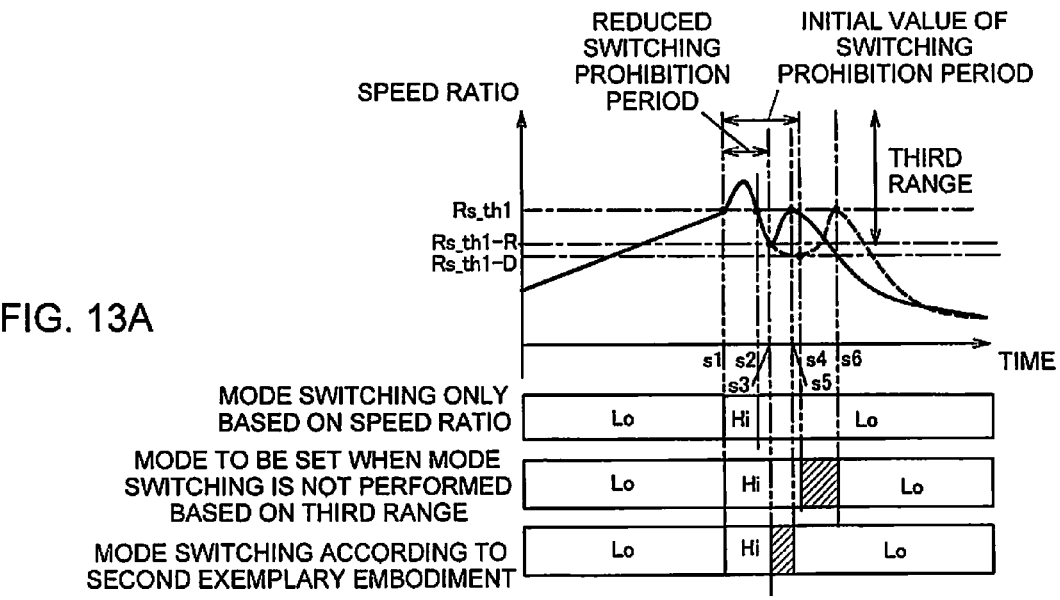
FIGS. 13A and 13B include charts respectively showing an example of time-series variation in speed ratio and mode in a condition that deviation of the speed ratio from a third range is detected.
Figure 13B:
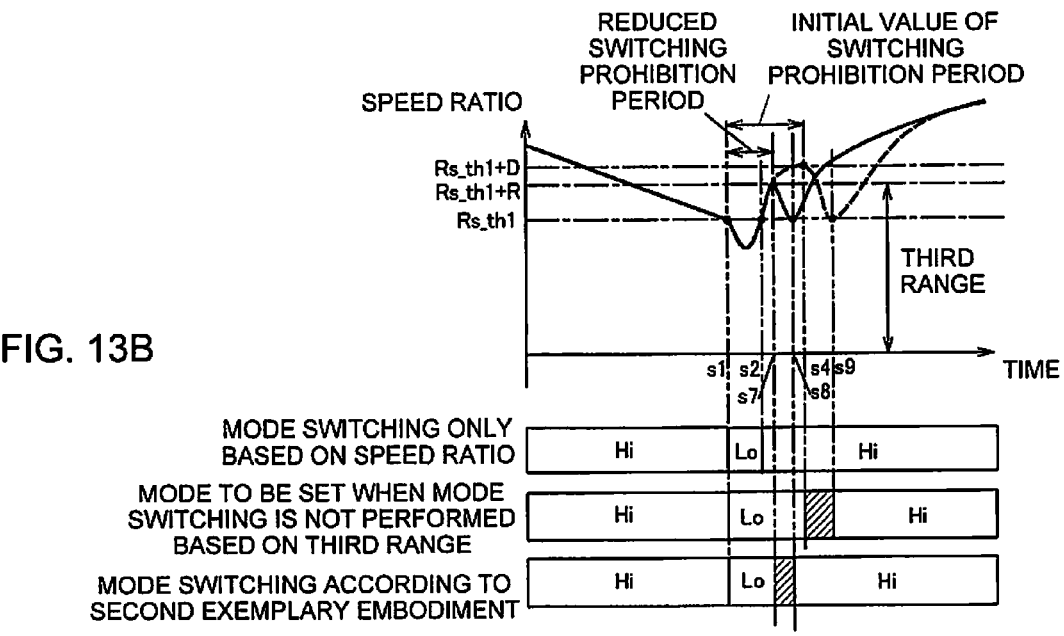

FIGS. 13A and 13B include charts respectively showing an example of time-series variation in speed ratio and mode in a condition that deviation of the speed ratio from the third range is detected. FIG. 13A shows an example of a condition that the speed ratio temporarily becomes higher than the first threshold Rs_th1, whereas FIG. 13B shows an example of a condition that the speed ratio temporarily becomes lower than the first threshold Rs_th1. It should be noted that for easily understanding of advantageous effects of the present exemplary embodiment, a dashed line in each of FIGS. 13A and 13B indicates variation in speed ratio in a condition that the clutch controlling unit 58 does not perform the action according to the present exemplary embodiment. Additionally in FIGS. 13A and 13B, for convenience of explanation, reference signs for indicating points of time are different from those in the first exemplary embodiment. However, time s1 and time s4 are respectively used to mean the same as time t1 and time t4 at which the switching prohibition period expires in the first exemplary embodiment.

In the example of FIG. 13A, at time s1, the speed ratio has increased to the first threshold Rs_th1. Let the switching prohibition period have elapsed before time s1 since switching into the Lo mode. At time s1, the clutch controlling unit 58 outputs the command signal for disengaging the L clutch CL to the L clutch control valve VL and simultaneously outputs the command signal for engaging the H clutch CH to the H clutch control valve VH to rapidly switch the power transmission 24 into the Hi mode. As a result, the Hi mode is actually set for the power transmission 24.

In a period from time s1 to time s2, the speed ratio becomes higher than or equal to the first threshold Rs_th1. However, at and after time s2, the speed ratio becomes lower than the first threshold Rs_th1. In this case, if mode switching is performed only on the basis of the speed ratio, the transmission path is switched into the Lo mode. However, a period from the time s2 to time s3 at which the speed ratio deviates from the third range is within the switching prohibition period. Hence, the clutch controlling unit 58 consecutively outputs the command signals for engaging the H clutch CH to the H clutch control valve VH in order to continuously keep setting the power transmission 24 in the Hi mode. Then, at time s3, the speed ratio becomes lower than the lower limit Rs_th1−R of the third range. Therefore, the speed ratio variation detecting unit 85 detects deviation of the speed ratio from the third range at time s3, and outputs the variation detection signal to the timer 83a. As a result, the switching prohibition period expires. Deviation of the speed ratio from the third range means that the speed ratio belongs to the inadmissible range. Therefore, the controller 27 performs the following control so as to make the speed ratio equal to the first threshold Rs_th1 after time s3.

The clutch controlling unit 58 may be configured to output a command signal for engaging the L clutch CL without making the L clutch CL slip (for regulating the clutch pressure of the L clutch CL to a predetermined pressure) to the L clutch control valve VL so as to quickly return the speed ratio to the mode switching threshold Rs_th1. Alternatively, the clutch controlling unit 58 may be configured to loosely engage the L clutch CL. After the relative rotational speed of the two rotational shafts of the L clutch CL falls into a predetermined speed range, then the clutch controlling unit 58 may be configured to engage the L clutch CL (at the predetermined clutch pressure) without making the L clutch CL slip so as to return the speed ratio to the mode switching threshold Rs_th1. In other words, the clutch controlling unit 58 may be configured to output a command signal for loosely engaging the L clutch CL to the L clutch control valve VL. After the relative rotational speed of the L clutch CL falls into the predetermined speed ratio, then the clutch controlling unit 58 may be configured to output the command signal for engaging the L clutch CL without making the L clutch CL slip to the L clutch control valve VL. As a result, at time s5, the speed ratio reaches the first threshold Rs_th1. It should be noted that mode switching by the present clutch controlling unit is shown with hatching from time s3 to time s5, because the L clutch CL and the H clutch CH are both engaged and hence the transmission path is set in neither the Lo mode nor the Hi mode. Alternatively, instead of the aforementioned control by the clutch controlling unit 58, the motor controlling unit 55 may be configured to receive a speed ratio inputted thereto from the speed ratio calculating unit 81a and output a suitable motor command signal for making the speed ratio reach the first threshold Rs_th1. In other words, the motor controlling unit 55 may be configured to control the rotational speeds of the motors MG1, MG2 so as to make the speed ratio reach the first threshold Rs_th1. When such feedback control causes the speed ratio to become the first threshold Rs_th1, the transmission path is set in the Hi mode from time s3 to time s5.

In the example of FIG. 13A, at time s5, the speed ratio has reached the first threshold Rs_th1. As soon as time s5 at which the speed ratio has reached the first threshold Rs_th1 comes, the clutch controlling unit 58 outputs the command signal for disengaging the H clutch CH to the H clutch control valve VH in order to rapidly switch the power transmission 24 into the Lo mode (the mode previously set before mode switching at time s1). Additionally, at time s5 that the speed ratio has reached the first threshold Rs_th1, the clutch controlling unit 58 starts outputting the clutch command signal for engaging the L clutch CL. As a result, at time s5, the transmission path is switched into the Lo mode.

If the control in the present exemplary embodiment is not performed, then the controller 27 is configured to perform the control of making the speed ratio equal to the first threshold Rs_th1 in a time period from time s4 to time s6 shown with hatching. If the control by either the clutch controlling unit 58 or the motor controlling unit 55 is not performed at time s3, it could be also possible that at time s4, the speed ratio might have become Rs_th1−D (D>R) that is lower than Rs_th1−R. In this case, vibrations of the vehicle body, caused when the controller 27 performs the control of making the speed ratio equal to the first threshold Rs_th1, become intense with increase in variation in speed ratio.

In the example of FIG. 13B, at time s1, the speed ratio has decreased to the first threshold Rs_th1. Let the switching prohibition period have elapsed before time s1 since switching into the Hi mode. At time s1, the clutch controlling unit 58 outputs the command signal for disengaging the H clutch CH to the H clutch control valve VH and simultaneously outputs the command signal for engaging the L clutch CL to the L clutch control valve VL so as to rapidly switch the power transmission 24 into the Lo mode. As a result, the Lo mode is actually set for the power transmission 24.

In a period from time s1 to time s2, the speed ratio is lower than or equal to the first threshold Rs_th1. However, at and after time s2, the speed ratio becomes higher than the first threshold Rs_th1. In this case, if mode switching is performed only on the basis of the speed ratio, the transmission path is set in the Hi mode. However, a period from time s2 to time s7 at which the speed ratio deviates from the third range is within the switching prohibition period. Hence, the clutch controlling unit 58 consecutively outputs the command signals for engaging the L clutch CL to the L clutch control valve VL so as to continuously keep setting the power transmission 24 in the Lo mode. Then, at time s7, the speed ratio becomes higher than the upper limit Rs_th1+R of the third range. Therefore, the speed ratio variation detecting unit 85 detects deviation of the speed ratio from the third range at time s7, and outputs the variation detection signal to the timer 83a. As a result, the switching prohibition period expires. Deviation of the speed ratio from the third range means that the speed ratio belongs to the inadmissible range. Therefore, the controller 27 performs the following control so as to make the speed ratio equal to the first threshold Rs_th1 after time s7.

The clutch controlling unit 58 may be configured to output the command signal for engaging the H clutch CH without making the H clutch CH slip (for regulating the clutch pressure of the H clutch CH to the predetermined pressure) to the H clutch control valve VH so as to quickly return the speed ratio to the mode switching threshold Rs_th1. Alternatively, the clutch controlling unit 58 may be configured to loosely engage the H clutch CH. After the relative rotational speed of the two rotational shafts of the H clutch CH falls into the predetermined speed range, then the clutch controlling unit 58 may be configured to engage the H clutch CH without making the H clutch CH slip (at the predetermined clutch pressure) so as to return the speed ratio to the mode switching threshold Rs_th1. In other words, the clutch controlling unit 58 may be configured to output the command signal for loosely engaging the H clutch CH to the H clutch control valve VH. After the relative rotational speed of the H clutch CH falls into the predetermined speed ratio, the clutch controlling unit 58 may be configured to output the command signal for engaging the H clutch CH without making the H clutch CH slip to the H clutch control valve VH. As a result, at time s8, the speed ratio reaches the first threshold Rs_th1. It should be noted that mode switching by the present clutch controlling unit is shown with hatching from time s7 to time s8, because the L clutch CL and the H clutch CH are both engaged and hence the transmission path is set in neither the Lo mode nor the Hi mode. It should be noted that instead of the aforementioned control by the clutch controlling unit 58, the motor controlling unit 55 may be configured to receive a speed ratio inputted thereto from the speed ratio calculating unit 81a and output a suitable motor command signal for making the speed ratio reach the first threshold Rs_th1. In other words, the motor controlling unit 55 may be configured to control the rotational speeds of the motors MG1, MG2 so as to make the speed ratio reach the first threshold Rs_th1. When such feedback control causes the speed ratio to become the first threshold Rs_th1, the transmission path is set in the Lo mode from time s7 to time s8.

In the example of FIG. 13B, at time s8, the speed ratio has reached the first threshold Rs_th1. As soon as time s8 at which the speed ratio has reached the first threshold Rs_th1 comes, the clutch controlling unit 58 outputs the command signal for disengaging the L clutch CL to the L clutch control valve VL so as to rapidly switch the power transmission 24 into the Hi mode (the mode previously set before mode switching at time s1). Additionally, at time s8 that the speed ratio has reached the first threshold Rs_th1, the clutch controlling unit 58 starts outputting the clutch command signal for engaging the H clutch CH. As a result, at time s8, the transmission path is switched into the Hi mode.

When the control in the present exemplary embodiment is not performed, then the controller 27 is configured to perform the control of making the speed ratio equal to the first threshold Rs_th1 in a time period from time s4 to time s9 shown with hatching. When the control by either the clutch controlling unit 58 or the motor controlling unit 55 is not performed at time s7, it could be also possible that at time s4, the speed ratio might have become Rs_th1+D (D>R) that is higher than Rs_th1+R. In this case, vibrations of the vehicle body, caused when the controller 27 performs the control of making the speed ratio equal to the first threshold Rs_th1, become intense with increase in variation in speed ratio.

Features

The features of the work vehicle 1 according to the present exemplary embodiments are as follows.

Even when the speed ratio reaches the first threshold Rs_th1 in the switching prohibition period, the clutch controlling unit 58 is configured not to perform mode switching anew until the switching prohibition period expires. Therefore, even in a condition that the speed ratio fluctuates around the mode switching threshold Rs_th1 in a short period of time, mode switching is inhibited from being frequently performed. Consequently, hunting can be inhibited that is caused by frequently switching the transmission path.

In the work vehicle 1 according to the first exemplary embodiment, the switching prohibition period is configured to be made expire when the trigger operation detecting unit 84 detects any of predetermined actions. The predetermined actions are operations to be performed by an operator intending to greatly change the vehicle speed, such as pressing down the accelerator operating member, pressing down the brake operating member, switching between forward and rearward moving directions, and switching among the gear stages. In such a case, the switching prohibition period is made expire, and thereby the power transmission 24 is capable of rapidly performing mode switching in accordance with operator's operational intention. Moreover, when any of the operations is performed, it is possible that the speed ratio may greatly deviate from a speed ratio range corresponding to the present mode and shocks in subsequent mode switching become more intense. Therefore, the switching prohibition period is made rapidly expire after any of the operations is performed, and thereby, shocks are alleviated that are caused in mode switching performed when the switching prohibition period expires.

In the work vehicle 1 according to the first exemplary embodiment, when the speed ratio belongs to the inadmissible range at the second point of time that the switching prohibition period expires, the controller 27 is configured to perform a control of making the speed ratio equal to the mode switching threshold Rs_th1. Then, when the speed ratio is made equal to the mode switching threshold Rs_th1, the clutch controlling unit 58 is configured to switch into a mode corresponding to the speed ratio at the second point of time. Accordingly, it is possible to alleviate shocks that are caused by performing mode switching when the switching prohibition period expires.

The aforementioned trigger operations are:

(a) the operation of changing the operating amount of the brake operating member 59a by the predetermined first amount of change ΔD1 or greater, (b) the operation of changing the operating amount of the accelerator operating member 51a by the predetermined second amount of change ΔD2 or greater, (c) the operation of moving the forward/rearward movement switch operating member 54a to a position different from its position located at the time t1, s1; and (d) the operation of operating the gearshift operating member 53a in order to change into a gear stage different from the gear stage set at time t1, s1, specifically, either of the operation of moving the shift range lever 531 to a position different from its position located at time t1, s1 or the operation of pressing down the kick down button 532.

When any of the trigger operations is performed, the vehicle speed of the work vehicle 1 greatly varies in many cases. In the present work vehicle 1, mode switching is rapidly performed when the trigger operation is performed. Hence, mode switching can be rapidly performed in accordance with variation in vehicle speed after the operation.

In the work vehicle 1 according to the second exemplary embodiment, the switching prohibition period is configured to be made expire when the speed ratio variation detecting unit 85 detects deviation of the speed ratio from the third range in the switching prohibition period. Then, when deviation of the speed ratio from the third range is detected, the controller 27 is configured to perform the control of making the speed ratio equal to the mode switching threshold Rs_th1. Then, when the speed ratio is made equal to the mode switching threshold Rs_th1, the clutch controlling unit 58 is configured to switch into a mode corresponding to the speed ratio at deviation from the third range. Accordingly, the controller 27 is not required to perform the control of making the speed ratio equal to the mode switching threshold Rs_th1 from its value that greatly deviates from the mode switching threshold Rs_th1. Therefore, it is possible to alleviate vibrations of the vehicle body to be caused by mode switching performed when the switching prohibition period expires.

When the transmission path is switched into the Hi mode, the speed ratio variation detecting unit 85 is configured to set, as the third range, a range of greater than or equal to a value that is less than the mode switching threshold Rs_th1 by a predetermined value R. On the other hand, when the transmission path is switched into the Lo mode, the speed ratio variation detecting unit 85 is configured to set, as the third range, a range of less than or equal to a value that is greater than the mode switching threshold Rs_th1 by the predetermined value R. Accordingly, the controller 27 is configured to perform the control of making the speed ratio equal to the mode switching threshold Rs_th1 when the speed ratio greatly deviates from the admissible range into which the speed ratio should intrinsically fall in the Hi/Lo mode. Consequently, it is possible to further alleviate vibrations of the vehicle body to be caused by mode switching performed when the switching prohibition period expires.

In the work vehicle 1 according to the second exemplary embodiment, the controller 27 is configured to perform the control of making the speed ratio equal to the mode switching threshold Rs_th1 when the speed ratio belongs to the inadmissible range at the second point of time that the switching prohibition period expires. Then, when the speed ratio is made equal to the mode switching threshold Rs_th1, the clutch controlling unit 58 is configured to switch into a mode corresponding to the speed ratio at the second point of time. Accordingly, it is possible to alleviate shocks to be caused by mode switching performed when the switching prohibition period expires.

Modifications

Exemplary embodiments of the present invention have been explained. However, the present invention is not limited to the aforementioned exemplary embodiments, and a variety of changes can be made without departing from the scope of the present invention.

The present invention is not limited to the aforementioned wheel loader, and may be applied to another type of work vehicle such as a bulldozer, a tractor, a forklift or a motor grader.

The present invention can be applied to not only the EMT but also another type of transmission such as the HMT. In this case, the first motor MG1 functions as a hydraulic motor and a hydraulic pump. Likewise, the second motor MG2 functions as a hydraulic motor and a hydraulic pump. The first motor MG1 and the second motor MG2 are variable displacement pumps/motors, and displacements thereof are configured to be controlled when the tilt angles of the swashplates or the tilting shafts thereof are controlled by the controller 27. Additionally, the displacements of the first motor MG1 and the second motor MG2 are controlled so as to output command torques calculated similarly to the aforementioned exemplary embodiments.

The speed ratio calculating unit 81, 81*a* may be configured not only to calculate the present speed ratio on the basis of the present input rotational speed and the present output rotational speed but also to calculate the speed ratio on the basis of another parameter. For example, the speed ratio calculating unit 81, 81*a* may be configured to calculate the speed ratio of the power transmission 24 on the basis of the rotational speed of the L clutch CL and that of the H clutch CH. Alternatively, the speed ratio calculating unit 81, 81*a* may be configured to calculate the speed ratio of the power transmission 24 on the basis of the rotational speed of the first motor MG1 and that of the second motor MG2.

Moreover, the speed ratio calculating unit 81, 81*a* may be configured to calculate another parameter corresponding to the speed ratio. Such a parameter is referred to as a speed ratio parameter. The clutch controlling unit 58, the timers 83 and 83*a*, the speed ratio variation detecting unit 85, and the motor controlling unit 55 may be configured to utilize the speed ratio parameter. With reference to FIG. 5, the speed ratio is derived by obtaining information regarding which of the Hi mode and the Lo mode is currently set and the rotational speed ratio of either of the motors MG1 and MG. Hence, for instance, the following can be utilized as the speed ratio parameter: the rotational speed ratio of the motor MG1; the rotational speed ratio of the motor MG2; and a ratio between the rotational speed of the shaft or gear of the power transmission 24, which depends on the rotational speed of either of the motors MG1 and MG2, and the rotational speed of the input shaft 61. The controller 27 is capable of performing similar processing to the aforementioned exemplary embodiments by performing the aforementioned processing with use of values of the speed ratio parameter respectively corresponding to the aforementioned mode switching threshold Rs_th1 and the boundary values of the first range, the second range, and the third range.

Unlike Table 1, in some of parameters that can be employed as the speed ratio parameter, the settings for the admissible range and the inadmissible range are not changed in accordance with modes. For example, when the rotational speed ratio of the motor MG2 is employed as the speed ratio parameter, as shown in FIG. 5, the mode switching threshold is set to be 0, and regardless of modes, the admissible range into which the motor rotational speed ratio should intrinsically fall is set to be a range of less than or equal to 0, whereas the inadmissible range is set to be a range of greater than 0. In this case, when the speed ratio parameter is changed into the mode switching threshold because the speed ratio parameter falls into the inadmissible range, it is desirable to perform mode switching.

Furthermore, the speed ratio calculating unit 81, 81*a* may be configured to calculate an estimated clutch engaged time required for clutch engagement on the basis of the clutch oil temperature and the engine rotational speed, and may be configured to output a prospective speed ratio to be estimated on the basis of the estimated clutch engaged time.

Switching between the Lo mode and the Hi mode may not be necessarily performed at the first threshold Rs_th1. It should be noted that when switching between the Lo mode and the Hi mode is performed at a value of the speed ratio other than the first threshold Rs_th1, the motor rotational speed is supposed to acutely vary in mode switching, and by the effect of this, adverse effects are even caused, such as acute variation in rotations of the input and output shafts or shortening of clutch life. Therefore, it is preferred to perform switching between the Lo mode and the Hi mode at the first threshold Rs_th1.

The clutches CF and CR may be respectively provided with pressure switches TL and TH. The pressure switch TL is preferably configured to transmit a detection signal to the controller 27 when the clutch pressure of the L clutch CL reaches a predetermined pressure. The pressure switch TH is preferably configured to transmit a detection signal to the controller 27 when the clutch pressure of the H clutch CH reaches a predetermined pressure. The predetermined pressure is a value of pressure corresponding to a pressure (fill pressure) at which each of the L clutch CL and the H clutch CH is completely filled up with the hydraulic oil. Therefore, each pressure switch TL, TH is preferably configured to detect completion of oil filling and output a detection signal to the controller 27. At this time, the clutch controlling unit 58 may be configured to output a setting signal to the timer 83 so as to cause the timer 83 to reset and start measuring time even at one of the points of time including the following "c" and "d" in addition to the aforementioned "a" and "b":

A point of time "c" after the controller 27 receives a detection signal detecting that the clutch pressure of the L clutch CL has become different from the fill pressure, and/or, receives a detection signal detecting that the clutch pressure of the H clutch CH has become equal to the fill pressure.

A point of time "d" after the controller 27 receives a detection signal detecting that the clutch pressure of the H clutch CH has become different from the fill pressure, and/or, receives a detection signal detecting that the clutch pressure of the L clutch CL has become equal to the fill pressure.

The aforementioned first and second exemplary embodiments may be used independently, or alternatively, may be used in combination. Combination of the first and second exemplary embodiments enables combination of the processing by FIG. 11B and the processing by FIGS. 13A and 13B. Hence, it is possible to reduce vibrations of the vehicle body to be caused when the controller 27 performs the control of making the speed ratio equal to the first threshold Rs_th1.

Additionally, in the aforementioned exemplary embodiments, the power transmission having two modes composed of the Hi mode and the Lo mode has been exemplified, but the present invention may be applied to a power transmission that is provided with a third clutch other than the H clutch CH and the L clutch CL and thus has three or more modes.

Figure 14:
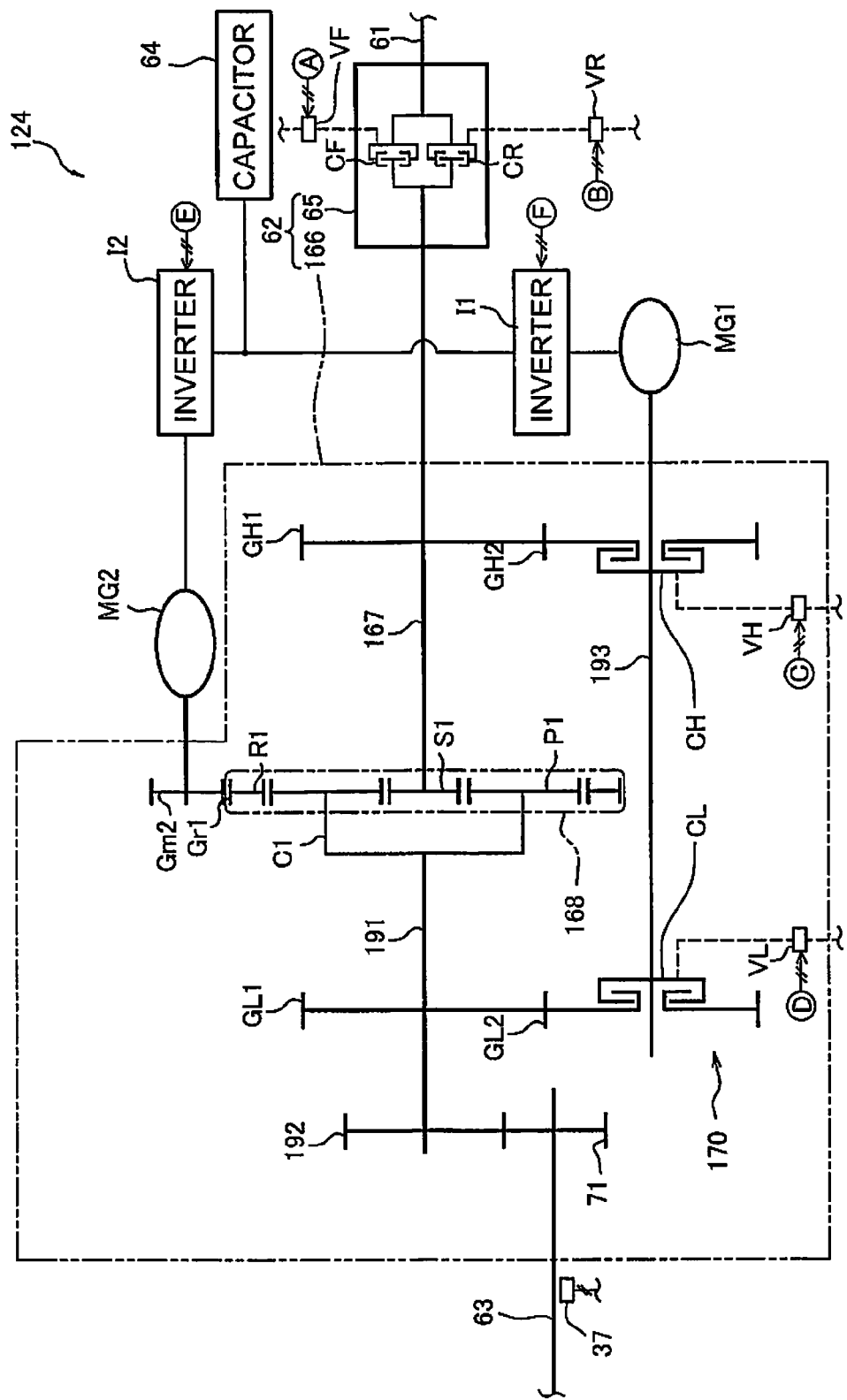
FIG. 14 is a schematic diagram showing a structure of a power transmission according to another exemplary embodiment.

The aforementioned power transmission 24 includes the first planetary gear mechanism 68 and the second planetary gear mechanism 69. However, the number of the planetary gear mechanisms provided for the power transmission is not limited to two. The power transmission may be provided with only one planetary gear mechanism. Alternatively, the power transmission may be provided with three or more planetary gear mechanisms. FIG. 14 is a schematic diagram of a structure of a power transmission 124 with which a work vehicle according to another exemplary embodiment is provided. The other constituent elements of the work vehicle according to another exemplary embodiment are similar to those of the work vehicle 1 according to the aforementioned exemplary embodiments, and hence, the detailed explanation thereof will not be described. Additionally, in FIG. 14, the same reference signs are assigned to the same constituent elements as those of the power transmission 24 according to the aforementioned exemplary embodiments.

As shown in FIG. 14, the power transmission 124 includes a gearshift mechanism 166. The gearshift mechanism 166 includes a planetary gear mechanism 168, a first transmission shaft 167, a second transmission shaft 191 and a second transmission shaft gear 192. The first transmission shaft 167 is coupled to the forward/rearward movement switch mechanism 65. The planetary gear mechanism 168 and the second transmission shaft gear 192 are disposed coaxially to the first transmission shaft 167 and the second transmission shaft 191.

The planetary gear mechanism 168 includes a sun gear S1, a plurality of planet gears P1, a carrier C1 supporting the plural planet gears P1, and a ring gear R1. The sun gear S1 is coupled to the first transmission shaft 167. The plural planet gears P1 are meshed with the sun gear S1, and are rotatably supported by the carrier C1. The carrier C1 is fixed to the second transmission shaft 191. The ring gear R1 is meshed with the plural planet gears P1 and is rotatable. Additionally, a ring outer peripheral gear Gr1 is provided on the outer periphery of the ring gear R1. The second motor gear Gm2 is fixed to the output shaft of the second motor MG2, and is meshed with the ring outer peripheral gear Gr1.

The second transmission shaft gear 192 is coupled to the second transmission shaft 191. The second transmission shaft gear 192 is meshed with the output gear 71, and the rotation of the second transmission shaft gear 192 is outputted to the output shaft 63 through the output gear 71.

The gearshift mechanism 166 includes a first high speed gear (hereinafter referred to as "a first H gear GH1"), a second high speed gear (hereinafter referred to as "a second H gear GH2"), a first low speed gear (hereinafter referred to as "a first L gear GL1"), a second low speed gear (hereinafter referred to as "a second L gear GL2"), a third transmission shaft 193 and a Hi/Lo switch mechanism 170.

The first H gear GH1 and the first L gear GL1 are disposed coaxially to the first transmission shaft 167 and the second transmission shaft 191. The first H gear GH1 is coupled to the first transmission shaft 167. The first L gear GL1 is coupled to the second transmission shaft 191. The second H gear GH2 is meshed with the first H gear GH1. The second L gear GL2 is meshed with the first L gear GL1. The second H gear GH2 and the second L gear GL2 are disposed coaxially to the third transmission shaft 193, and are disposed so as to be rotatable with respect to the third transmission shaft 193. The third transmission shaft 193 is coupled to the output shaft of the first motor MG1.

The Hi/Lo switch mechanism 170 is a mechanism for switching the driving force transmission path in the power transmission 24 between the high speed mode (the Hi mode) in which the vehicle speed is high and the low speed mode (the Lo mode) in which the vehicle speed is low. The Hi/Lo switch mechanism 170 includes the H clutch CH configured to be engaged in the Hi mode and the L clutch CL configured to be engaged in the Lo mode. The H clutch CH is configured to engage/disengage the second H gear GH2 and the third transmission shaft 193. On the other hand, the L clutch CL is configured to engage/disengage the second L gear GL2 and the third transmission shaft 193.

Figure 15:
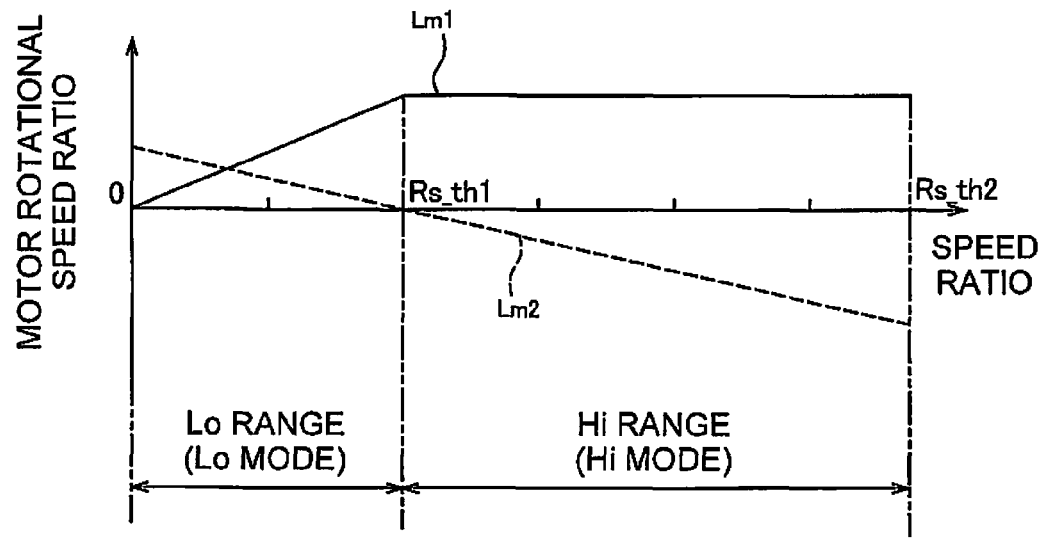
FIG. 15 is a diagram showing variation in rotational speed of a first motor and variation in rotational speed of a second motor with respect to a speed ratio of the power transmission according to another exemplary embodiment.
Figure 16:
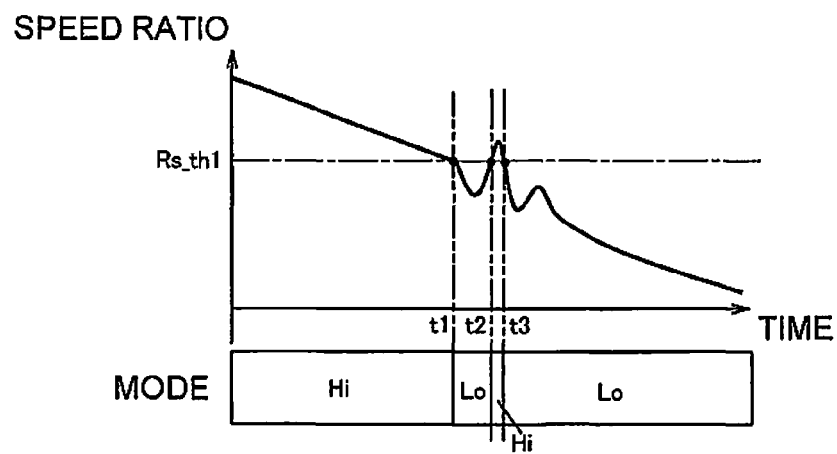
FIG. 16 is a diagram showing variation in mode of a power transmission path in a conventional art.

Next, an action of the power transmission 124 will be explained. FIG. 15 is a chart showing a rotational speed ratio of each motor MG1, MG2 with respect to a speed ratio in the power transmission 124. In FIG. 15, a solid line indicates the rotational speed ratio of the first motor MG1, whereas a dashed line indicates the rotational speed ratio of the second motor MG2. In the Lo range (the Lo mode) in which the speed ratio is greater than or equal to 0 and less than or equal to Rs_th1, the L clutch CL is engaged whereas the H clutch CH is disengaged. In the Lo range, the H clutch CH is disengaged, and thus, the second H gear GH2 and the third transmission shaft 193 are disconnected. On the other hand, the L clutch CL is engaged, and thus, the second L gear GL2 and the third transmission shaft 193 are connected.

In the Lo range, a driving force from the engine 21 is inputted into the sun gear S1 through the first transmission shaft 167, and is outputted to the second transmission shaft 191 from the carrier C1. On the other hand, the driving force inputted into the sun gear S1 is transmitted to the ring gear R1 from the planet gears P1, and is outputted to the second motor MG2 through the ring outer peripheral gear Gr1 and the second motor gear Gm2. In the Lo range, the second motor MG2 functions as a generator, and part of electric power generated by the second motor MG2 is stored in the capacitor 64.

Additionally, in the Lo range, the first motor MG1 functions as an electric motor. The driving force of the first motor MG1 is outputted to the second transmission shaft 191 through a path of the third transmission shaft 193, the second L gear GL2, and then the first L gear GL1. A net driving force, resulting from composition of the driving forces in the second transmission shaft 191 as described above, is transmitted to the output shall 63 through the second transmission shaft gear 192 and the output gear 71.

In the Hi range (the Hi mode) in which the speed ratio is greater than or equal to Rs_th1, the H clutch CH is engaged whereas the L clutch CL is disengaged. In the Hi range, the H clutch CH is engaged, and hence, the second H gear GH2 and the third transmission shaft 193 are connected. On the other hand, the L clutch CL is disengaged, and thus, the second L gear GL2 and the third transmission shaft 193 are disconnected.

In the Hi range, the driving force from the engine 21 is inputted into the sun gear S1, and is outputted to the second transmission shaft 191 from the carrier C1. On the other hand, the driving force from the engine 21 is outputted to the first motor MG1 from the first H gear GH1 through the second H gear GH2 and the third transmission shaft 193. In the Hi range, the first motor MG1 functions as a generator, and thus, part of electric power generated by the first motor MG1 is stored in the capacitor 64.

On the other hand, the driving force of the second motor MG2 is outputted to the second transmission shaft 191 through a path of the second motor gear Gm2, the ring outer peripheral gear Gr1, the ring gear R1, and then the carrier C1. A net driving force, resulting from composition of the driving forces in the second transmission shaft 191, is transmitted to the output shaft 63 through the second transmission shaft gear 192 and the output gear 71.

A control of the power transmission 124 in the work vehicle according to another exemplary embodiment is similar to that of the power transmission 24 according to the aforementioned exemplary embodiments.

According to the present invention, it is possible to provide a work vehicle having a power transmission of an HMT or EMT type and a plurality of settings of transmission path for a driving force which inhibits hunting to be caused by frequently switching between the settings of transmission path, and to provide a method of controlling the work vehicle.

The invention claimed is:

1. A work vehicle, comprising:
an engine;
a hydraulic pump configured to be driven by the engine;
a work implement configured to be driven by a hydraulic oil discharged from the hydraulic pump;
a travelling apparatus configured to be driven by the engine;
a power transmission configured to transmit a driving force from the engine to the travelling apparatus;
a controller configured to control the power transmission; and
an operating device configured to be operated by an operator,
the power transmission including
an input shaft,
an output shaft,
a gear mechanism having a planetary gear mechanism, the gear mechanism being configured to transmit a rotation of the input shaft to the output shaft,
a motor connected to a rotary element of the planetary gear mechanism,
a first clutch for switching a transmission path for the driving force in the power transmission into a first mode, and
a second clutch for switching the transmission path for the driving force in the power transmission into a second mode,
the power transmission being configured such that
when the transmission path is set in the first mode, the first clutch is engaged and the second clutch is disengaged,
when the transmission path is set in the second mode, the second clutch is engaged and the first clutch is disengaged,
a speed ratio of the output shaft to the input shaft changes in response to a change in a rotational speed of the motor,
when a speed ratio parameter corresponding to the speed ratio is a predetermined mode switching threshold, a rotational speed ratio of the motor to the input shaft in the first mode equals a rotational speed ratio of the motor to the input shaft in the second mode, and
the controller including
a clutch controlling unit configured to switch the transmission path from one to the other of the first and second modes when the speed ratio parameter reaches the mode switching threshold,
a trigger operation detecting unit configured to detect whether or not a predetermined operation is performed by the operator, and
a timer configured to measure a period of time elapsed from a first point of time at which the transmission path is switched into the other mode,
the clutch controlling unit being configured to keep setting the transmission path in the other mode even when the speed ratio parameter again reaches the mode switching threshold until a switching prohibition period expires as long as the elapsed period of time is within the switching prohibition period, the switching prohibition period having a predetermined initial value, and
the trigger operation detecting unit being configured to terminate the switching prohibition period when detecting the predetermined operation in the switching prohibition period.

2. The work vehicle according to claim 1, wherein
one of a first range and a second range is defined as an admissible range whereas the other of the first range and the second range is defined as an inadmissible range, the first range being a range in which the speed ratio parameter is greater than or equal to the mode switching threshold, the second range being a range in which the speed ratio parameter is less than or equal to the mode switching threshold,
the controller is configured to perform a control of making the speed ratio parameter equal to the mode switching threshold when the speed ratio parameter belongs to the inadmissible range at a second point of time at which the switching prohibition period expires, and
the clutch controlling unit is configured to switch the transmission path into the one mode when the speed ratio parameter is made equal to the mode switching threshold.

3. The work vehicle according to claim 1, wherein
the operating device includes a brake operating member, and
the predetermined operation is an operation of changing an operating amount of the brake operating member by a predetermined amount of change or greater.

4. The work vehicle according to claim 1, wherein
the operating device includes an accelerator operating member, and
the predetermined operation is an operation of changing an operating amount of the accelerator operating member by a predetermined amount of change or greater.

5. The work vehicle according to claim 1, wherein
the operating device includes a forward/rearward movement switch operating member, and
the predetermined operation is an operation of moving the forward/rearward movement switch operating member to a position different from a position thereof located at the first point of time.

6. The work vehicle according to claim 1, wherein
the operating device includes a gearshift operating member, and
the predetermined operation is an operation of operating the gearshift operating member so as to shift into a gear stage different from a gear stage set at the first point of time.

7. The work vehicle according to claim 6, wherein
the gearshift operating member is a shift range lever, and
the predetermined operation is an operation of moving the shift range lever to a position different from a position thereof located at the first point of time.

8. The work vehicle according to claim 6, wherein
the gearshift operating member is a kick down button, and
the predetermined operation is an operation of pressing down the kick down button.

9. A work vehicle, comprising:
an engine;
a hydraulic pump configured to be driven by the engine;
a work implement configured to be driven by a hydraulic oil discharged from the hydraulic pump;
a travelling apparatus configured to be driven by the engine;
a power transmission configured to transmit a driving force from the engine to the travelling apparatus; and
a controller configured to control the power transmission,
the power transmission including
an input shaft,
an output shaft,
a gear mechanism having a planetary gear mechanism, the gear mechanism being configured to transmit a rotation of the input shaft to the output shaft,
a motor connected to a rotary element of the planetary gear mechanism,
a first clutch for switching a transmission path for the driving force in the power transmission into a first mode, and
a second clutch for switching the transmission path for the driving force in the power transmission into a second mode,
the power transmission being configured such that
when the transmission path is set in the first mode, the first clutch is engaged and the second clutch is disengaged,
when the transmission path is set in the second mode, the second clutch is engaged and the first clutch is disengaged,
a speed ratio of the output shaft to the input shaft changes in response to a change in a rotational speed of the motor,
when a speed ratio parameter corresponding to the speed ratio is a predetermined mode switching threshold, a rotational speed ratio of the motor to the input shaft in the first mode equals a rotational speed ratio of the motor to the input shaft in the second mode, and
the controller including
a clutch controlling unit configured to switch the transmission path from one to the other of the first and second modes when the speed ratio parameter reaches the mode switching threshold,
a timer configured to measure a period of time elapsed from a first point of time at which the transmission path is switched into the other mode, and
a speed ratio variation detecting unit configured to detect whether or not the speed ratio parameter deviates from a third range including the mode switching threshold,
the clutch controlling unit is being configured to keep setting the transmission path in the other mode even when the speed ratio parameter again reaches the mode switching threshold until a switching prohibition period expires as long as the elapsed period of time is included in the switching prohibition period, the switching prohibition period having a predetermined initial value, and
the speed ratio variation detecting unit being configured to terminate the switching prohibition period when detecting deviation of the speed ratio parameter from the third range including the mode switching threshold.

10. The work vehicle according to claim 9, wherein
the controller is configured to perform a control of making the speed ratio parameter equal to the mode switching threshold after the switching prohibition period is terminated due to deviation of the speed ratio parameter from the third range, and
the clutch controlling unit is configured to switch the transmission path into the one mode when the speed ratio parameter is made equal to the mode switching threshold.

11. The work vehicle according to claim 9, wherein
one of a first range and a second range is defined as an admissible range whereas the other of the first range and the second range is defined as an inadmissible range, the first range being a range in which the speed ratio parameter is greater than or equal to the mode switching threshold, the second range being a range in which the speed ratio parameter is less than or equal to the mode switching threshold,
the speed ratio variation detecting unit is configured such that
when the first range is defined as the admissible range, the speed ratio variation detecting unit sets a range of values greater than or equal to a value that is less than the mode switching threshold by a predetermined value as the third range, and
when the second range is defined as the admissible range, the speed ratio variation detecting unit sets a range of values less than or equal to a value that is greater than the mode switching threshold by a predetermined value as the third range.

12. The work vehicle according to claim 9, wherein
one of a first range and a second range is defined as an admissible range whereas the other of the first range and the second range is defined as an inadmissible range, the first range being a range in which the speed ratio parameter is greater than or equal to the mode switching threshold, the second range being a range in which the speed ratio parameter is less than or equal to the mode switching threshold, the controller is configured to perform a control of making the speed ratio parameter equal to the mode switching threshold when the speed ratio parameter belongs to the inadmissible range at a second point of time that the switching prohibition period is terminated, and the clutch controlling unit is configured to switch the transmission path into the one mode when the speed ratio parameter is made equal to the mode switching threshold.

13. A method of controlling a work vehicle equipped with a power transmission,
the power transmission including
an input shaft,
an output shaft,
a gear mechanism having a planetary gear mechanism, the gear mechanism being configured to transmit a rotation of the input shaft to the output shaft,
a motor connected to a rotary element of the planetary gear mechanism,
a first clutch for switching a transmission path for a driving force in the power transmission into a first mode, and
a second clutch for switching the transmission path for the driving force in the power transmission into a second mode,
the rower transmission being configured such that
when the transmission path is set in the first mode, the first clutch is engaged and the second clutch is disengaged,
when the transmission path is set in the second mode, the second clutch is engaged and the first clutch is disengaged,
a speed ratio of the output shaft to the input shaft changes in response to a change in a rotational speed of the motor,
when a speed ratio parameter corresponding to the speed ratio is a predetermined mode switching threshold, a rotational speed ratio of the motor to the input shaft in the first mode equals a rotational speed ratio of the motor to the input shaft in the second mode, and
the control method comprising:
switching the transmission path from one to the other of the first and second modes when the speed ratio parameter reaches the mode switching threshold,
detecting whether or not a predetermined operation is performed by an operator,
measuring a period of time elapsed from a first point of time at which the transmission path is switched into the other mode,
keeping the transmission path in the other mode even when the speed ratio parameter again reaches the mode switching threshold while the elapsed period of time is within the switching prohibition period, the switching prohibition period having a predetermined initial value, and
terminating the switching prohibition period when the predetermined operation is detected in the switching prohibition period.

14. A method of controlling a work vehicle equipped with a power transmission,
the power transmission including
an input shaft,
an output shaft,
a gear mechanism having a planetary gear mechanism, the gear mechanism being configured to transmit a rotation of the input shaft to the output shaft,
a motor connected to a rotary element of the planetary gear mechanism,
a first clutch for switching a transmission path for a driving force in the power transmission into a first mode, and
a second clutch for switching the transmission path for the driving force in the power transmission into a second mode,
the power transmission being configured such that
when the transmission path is set in the first mode, the first clutch is engaged and the second clutch is disengaged,
when the transmission path is set in the second mode, the second clutch is engaged and the first clutch is disengaged,
a speed ratio of the output shaft to the input shaft changes in response to a change in a rotational speed of the motor,
when a speed ratio parameter corresponding to the speed ratio is a predetermined mode switching threshold, a rotational speed ratio of the motor to the input shaft in the first mode equals a rotational speed ratio of the motor to the input shaft in the second mode, and
the control method comprising:
switching the transmission path from one to the other of the first and second modes when the speed ratio parameter reaches the mode switching threshold,
measuring a period of time elapsed from a first point of time at which the transmission path is switched into the other mode,
detecting whether or not the speed ratio parameter deviates from a predetermined third range including the mode switching threshold,
keeping the transmission path in the other mode even when the speed ratio parameter again reaches the mode switching threshold while the elapsed period of time is within the switching prohibition period, the switching prohibition period having a predetermined initial value, and
terminating the switching prohibition period when deviation of the speed ratio parameter from the third range including the mode switching threshold is detected.

* * * * *